(12) United States Patent
Osako et al.

(10) Patent No.: US 11,462,200 B2
(45) Date of Patent: Oct. 4, 2022

(54) SIGNAL PROCESSING APPARATUS AND METHOD, AND PROGRAM

(71) Applicant: Sony Corporation, Tokyo (JP)

(72) Inventors: Keiichi Osako, Tokyo (JP); Yuhki Mitsufuji, Tokyo (JP); Masafumi Takahashi, Kanagawa (JP); Yukara Ikemiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/266,486

(22) PCT Filed: Jul. 30, 2019

(86) PCT No.: PCT/JP2019/029813
§ 371 (c)(1),
(2) Date: Feb. 5, 2021

(87) PCT Pub. No.: WO2020/036058
PCT Pub. Date: Feb. 20, 2020

(65) Prior Publication Data
US 2021/0241746 A1 Aug. 5, 2021

(30) Foreign Application Priority Data
Aug. 13, 2018 (JP) .............................. JP2018-152451

(51) Int. Cl.
*G10K 11/175* (2006.01)
*H04R 3/12* (2006.01)
(Continued)

(52) U.S. Cl.
CPC .......... *G10K 11/1752* (2020.05); *G06V 40/10* (2022.01); *G10L 25/51* (2013.01); *H04R 1/403* (2013.01); *H04R 3/12* (2013.01)

(58) Field of Classification Search
CPC .... G10K 11/1752; G06V 40/10; G10L 25/51; H04R 1/403; H04R 3/12
(Continued)

(56) References Cited

U.S. PATENT DOCUMENTS

| 2013/0259254 A1 | 10/2013 | Xiang |
| 2014/0064526 A1* | 3/2014 | Otto ......................... H04R 5/04 381/300 |

(Continued)

FOREIGN PATENT DOCUMENTS

| EP | 3048608 A1 | 7/2016 |
| EP | 3484177 A1 | 5/2019 |

(Continued)

OTHER PUBLICATIONS

International Search Report and English translation thereof dated Oct. 1, 2019 in connection with International Application No. PCT/JP2019/029813.

*Primary Examiner* — Paul Kim
(74) *Attorney, Agent, or Firm* — Wolf, Greenfield & Sacks, P.C.

(57) ABSTRACT

The present technology relates to a signal processing apparatus and method, and a program that can easily make a leaking sound difficult to hear.
A signal processing apparatus includes a masking sound generation unit that, in a case where a first content is reproduced in a first region and a second content is reproduced in a second region by wave field synthesis using a speaker array, generates a masking sound for masking a sound of the first content and a sound of the second content heard in a region between the first region and the second region. The present technology can be applied to content reproduction systems.

15 Claims, 21 Drawing Sheets

(51) Int. Cl.
  *G10L 25/51* (2013.01)
  *H04R 1/40* (2006.01)
  *G06V 40/10* (2022.01)

(58) Field of Classification Search
  USPC ........................................................ 381/73.1
  See application file for complete search history.

(56) References Cited

U.S. PATENT DOCUMENTS

2014/0140525 A1   5/2014   Satou et al.
2017/0316773 A1   11/2017  Walther et al.

FOREIGN PATENT DOCUMENTS

| JP | 2008-103851 A | 5/2008 |
| JP | 2011-211266 A | 10/2011 |
| JP | 2013-073016 A | 4/2013 |
| JP | 2014-102308 A | 6/2014 |
| WO | WO 2016/116330 A1 | 7/2016 |
| WO | WO 2018/008396 A1 | 1/2018 |
| WO | WO 2018/066384 A1 | 4/2018 |

* cited by examiner

FIG. 4

| DAY OF WEEK | TIME ZONE | CONTENT SOUND REPRODUCTION LEVEL | MASKING SOUND REPRODUCTION LEVEL | MASKING SOUND PARAMETER |
|---|---|---|---|---|
| SUNDAY | 8:00~12:00 | 25dB | 3dB | AIR CONDITIONING |
| | 12:00~17:00 | 35dB | 10dB | CROWD+AIR CONDITIONING |
| | 17:00~20:00 | 30dB | 5dB | CROWD |
| MONDAY | 7:00~11:00 | 30dB | 5dB | CROWD+AIR CONDITIONING |
| | 11:00~18:00 | 30dB | 5dB | CROWD+AIR CONDITIONING |
| | 18:00~22:00 | 25dB | 3dB | CROWD+AIR CONDITIONING |
| ... | ... | ... | ... | ... |

FIG. 15

| BACKGROUND NOISE SOUND PRESSURE | CONTENT SOUND REPRODUCTION LEVEL | MASKING SOUND REPRODUCTION LEVEL | MASKING SOUND PARAMETER |
|---|---|---|---|
| 60dBA | 10dB | 3dB | AIR CONDITIONING |
| 70dBA | 20dB | 6dB | FREQUENCY CHARACTERISTICS OF MICROPHONE ACQUISITION SOUND |
| 80dBA | 30dB | 9dB | FREQUENCY CHARACTERISTICS OF MICROPHONE ACQUISITION SOUND |
| ... | ... | ... | ... |

FIG. 17

| SN RATIO | CONTENT SOUND REPRODUCTION LEVEL | MASKING SOUND REPRODUCTION LEVEL VARIATION | MASKING SOUND PARAMETER |
|---|---|---|---|
| −6dB | 20dB | −6dB | AIR CONDITIONING+CROWD |
| 0dB | 20dB | 0dB | AIR CONDITIONING+CROWD |
| 6dB | 20dB | 6dB | AIR CONDITIONING+CROWD |
| ... | ... | ... | ... |

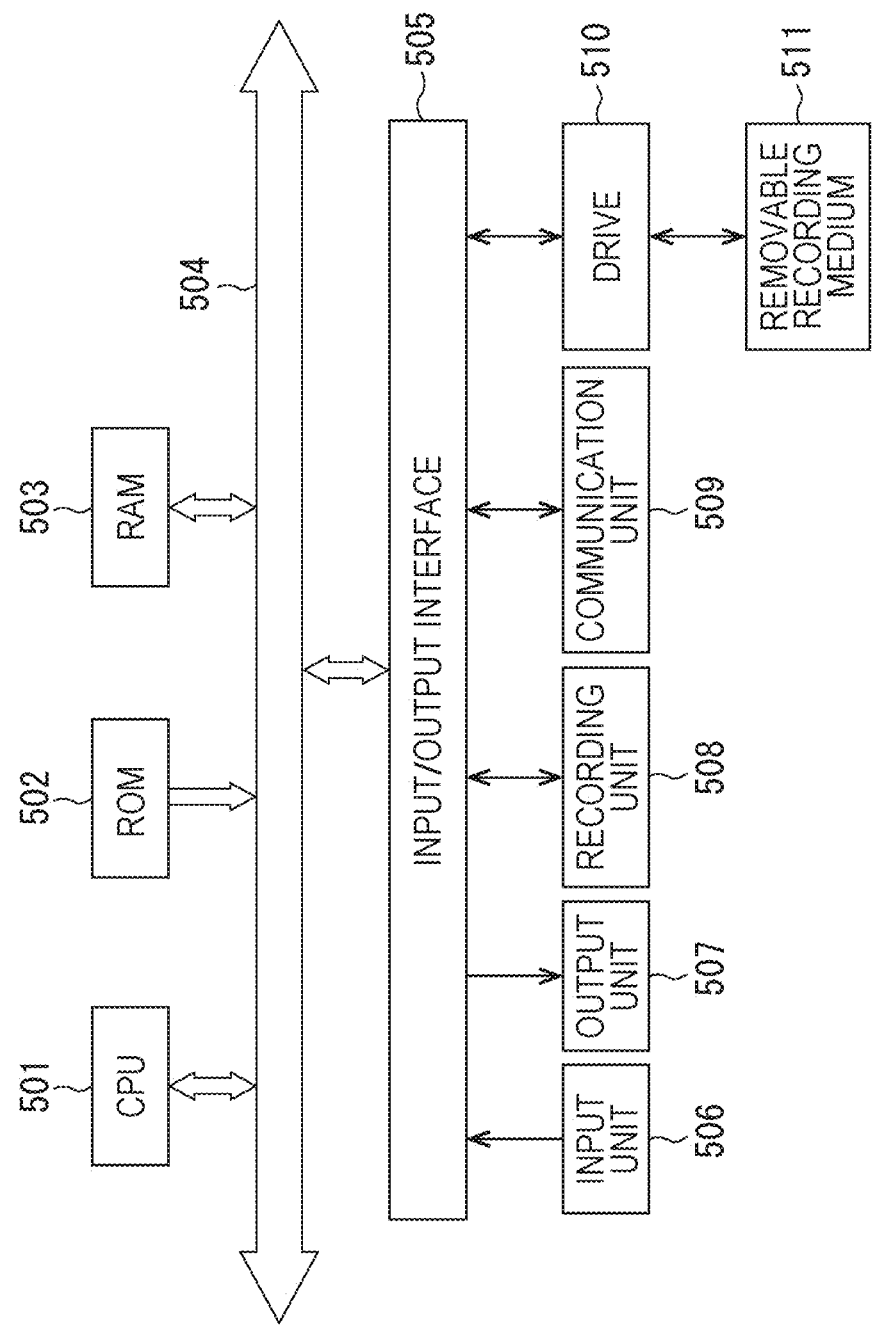

SIGNAL PROCESSING APPARATUS AND METHOD, AND PROGRAM

CROSS REFERENCE TO RELATED APPLICATIONS

This is a U.S. National Stage Application under 35 U.S.C. §371, based on International Application No. PCT/JP2019/029813, filed Jul. 30, 2019, which claims priority to Japanese Patent Application JP 2018-152451, filed Aug. 13, 2018, each of which is hereby incorporated by reference in its entirety.

TECHNICAL FIELD

The present technology relates to a signal processing apparatus and method, and a program, and more particularly, to a signal processing apparatus and method, and a program that can easily make leaking sounds difficult to hear.

BACKGROUND ART

In recent years, multi-zone reproduction using wave field synthesis technology has been known. In multi-zone reproduction, spatial division of an audible sound is realized by arbitrarily changing the reproduction sound pressure for each of a plurality of divided areas (regions).

By using such multi-zone reproduction, for example, it is possible to make voice guidance about a painting heard only in the region in front of the painting in a museum, and to make no sound heard in the other regions.

Furthermore, for example, in a public facility such as an airport or a station, it is also possible to present voice information in different languages to facility users for each of a plurality of regions.

By the way, in multi-zone reproduction, when a listener hears a leaking sound of another region while listening to a sound presented in a predetermined region, it becomes extremely difficult for the listener to acquire sound information. Therefore, it is important that a sound can be heard only within a target region. In other words, it is demanded to prevent a sound from leaking around the boundary of a target region.

Therefore, there has been proposed a technique in which, for example, a pair of speakers is arranged so that the distance between the speakers is one-eighth wavelength to one wavelength of a radiated sound wave, and the sound waves from those speakers are caused to interfere with each other to cancel the sound (see, for example, Patent Document 1).

In Patent Document 1, a filter used to cancel the sound is adjusted on the basis of detection output by a microphone provided in front of the speaker pair. Then, by outputting the sound waves from the speaker pair on the basis of an acoustic signal subjected to filtering processing by the obtained filter, the cancellation due to the interference of the sound waves is realized at a control point where the microphone is arranged.

Furthermore, there has also been proposed a technique in which a sensor is used to recognize the movement of a user into a predetermined guidance region, and when the user enters the guidance region, a voice corresponding to the guidance region is reproduced on the basis of an acoustic signal subjected to filtering processing by a predetermined filter (see, for example, Patent Document 2).

In Patent Document 2, by generating a filter so that observation signals at a plurality of control points become a desired plane wave, it is possible to generate a plane wave with suppressed spread and realize voice reproduction in the guidance region.

CITATION LIST

Patent Document

Patent Document 1: Japanese Patent Application Laid-Open No. 2000-295697
Patent Document 2: Japanese Patent Application Laid-Open No. 2017-161448

SUMMARY OF THE INVENTION

Problems to be Solved by the Invention

However, with the above-mentioned techniques, it is difficult to easily make a leaking sound leaking out of the target region difficult to hear.

For example, in the technique described in Patent Document 1, a sound is canceled at a control point where a microphone is installed, but sounds leak at a position other than the control point. In particular, the farther away from the control point, the greater the sound leakage.

Furthermore, for example, in the technique described in Patent Document 2, a large number of control points are required to form one guidance region, but the number of control points that can be created in principle is a number one or more less than the number of speakers constituting a speaker array used for voice reproduction. Therefore, a large number of speakers are required to form one guidance region.

The present technology has been made in view of such circumstances and easily makes a leaking sound difficult to hear.

Solutions to Problems

A signal processing apparatus according to an aspect of the present technology includes a masking sound generation unit that, in a case where a first content is reproduced in a first region and a second content is reproduced in a second region by wave field synthesis using a speaker array, generates a masking sound for masking a sound of the first content and a sound of the second content heard in a region between the first region and the second region.

A signal processing method or program according to an aspect of the present technology includes a step of: in a case where a first content is reproduced in a first region and a second content is reproduced in a second region by wave field synthesis using a speaker array, generating a masking sound for masking a sound of the first content and a sound of the second content heard in a region between the first region and the second region.

According to an aspect of the present technology, in a case where a first content is reproduced in a first region and a second content is reproduced in a second region by wave field synthesis using a speaker array, a masking sound for masking a sound of the first content and a sound of the second content heard in a region between the first region and the second region is generated.

Effects of the Invention

According to one aspect of the present technology, it is possible to easily make a leaking sound difficult to hear.

Note that effects described herein are not necessarily limited, but may also be any of those described in the present disclosure.

BRIEF DESCRIPTION OF DRAWINGS

FIG. 4 is a diagram showing an example of a parameter table.

FIG. 15 is a diagram showing an example of a parameter table.

FIG. 17 is a diagram showing an example of a parameter table.

FIG. 21 is a diagram showing a configuration example of a computer.

MODE FOR CARRYING OUT THE INVENTION

An embodiment to which the present technology has been applied is described below with reference to the drawings.

First Embodiment

Regarding the Present Technology

The present technology can easily make a leaking sound difficult to hear in a case where sounds of different pieces of content are reproduced in different regions by masking sounds of each content with a predetermined level of masking sound in a region present between the regions.

First, a leaking sound in multi-zone reproduction will be described.

Figure 1:
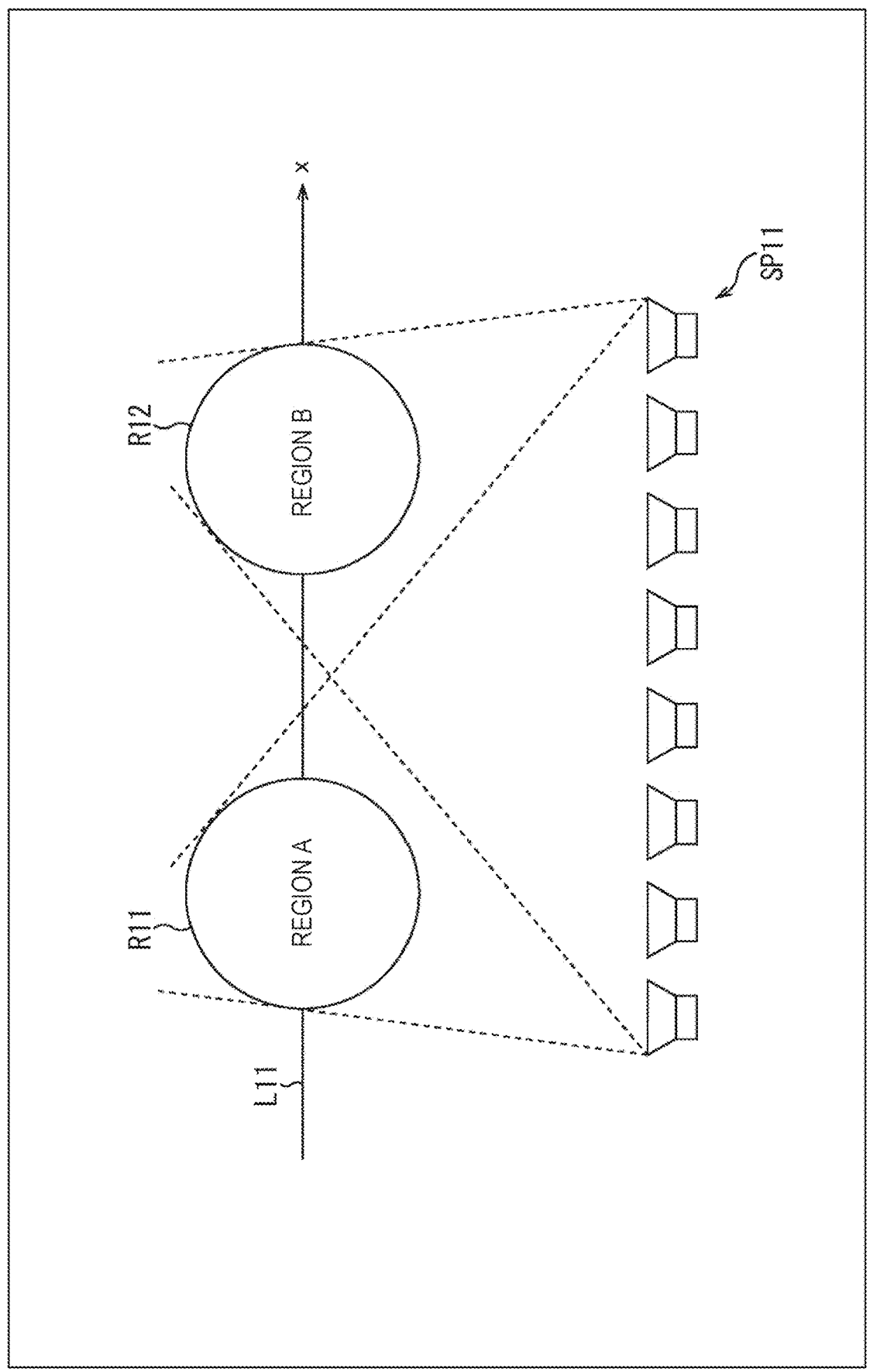
FIG. 1 is a diagram explaining multi-zone reproduction.

For example, performing multi-zone reproduction using a speaker array SP11 as shown in FIG. 1 is considered. Note that, for the sake of simplicity of description, a control point, which is a position where a sound is canceled, that is, a position the sound is silenced, is not drawn here.

Now, it is assumed that content A, that is, the sound of the content A is reproduced in a region A by wave field synthesis, and content B is reproduced in a region B.

Here, a divided region R11 is the region A that is a listening area where the content A is to be heard, and a divided region R12 is the region B that is a listening area where the content B is to be heard. In the following, the region where the content is to be heard, that is, the listening area of the content is also particularly referred to as a divided region.

Furthermore, the content A and the content B are considered to be different pieces of music and voices. Note that, hereinafter, the sound of predetermined content will also be referred to as a content sound.

Figure 2:
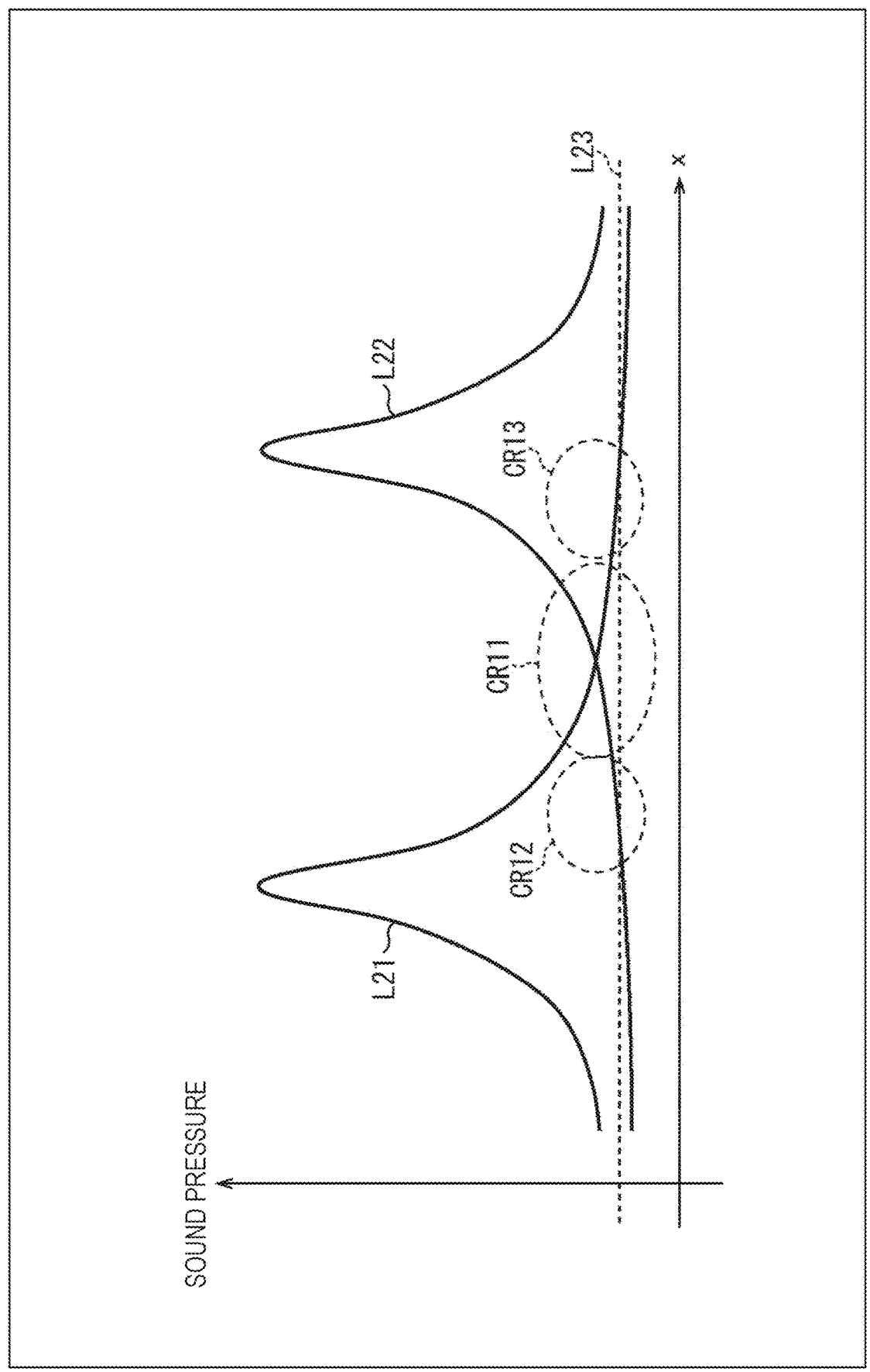
FIG. 2 is a diagram explaining a sound pressure distribution of content sound and background noise.

For example, in a case where the content A and the content B are being reproduced simultaneously, the sound pressure distribution on an x-axis indicated by a straight line L11 in the drawing is as shown in FIG. 2. Note that, in FIG. 2, the horizontal axis indicates the position in the x-axis direction, and the vertical axis indicates the sound pressure at each position.

In the example shown in FIG. 2, a curve L21 indicates the sound pressure distribution of the sound of the content A, and a curve L22 indicates the sound pressure distribution of the sound of the content B.

Furthermore, a straight line L23 indicates the sound pressure level of background noise around the speaker array SP11. The background noise shall include sounds from any surrounding sound sources in the vicinity of the speaker array SP11, that is, voices and footsteps of people passing through the surrounding environment, air conditioning sounds, and the like.

Normally, in the region A and the region B, the sounds of the content A and the content B are reproduced at a sound pressure higher than the background noise level in order to make the sounds easy for the listener to hear.

Specifically, for example, in a case where the background noise is about 60 dB, the sounds of the content A and the content B are reproduced at 80 dB or the like.

At this time, a leaking sound from the divided region is generated near the boundary of the divided region.

Note that the leaking sound referred to here is a content sound that leaks out of the divided region and is heard. That is, the content sound that is heard outside the divided region is the leaking sound.

For example, in the example of FIG. 2, the sounds of the content A and the content B in the portion surrounded by a dotted line CR11 is a leaking sound heard in the region between the region A and the region B, which are divided regions, that is, the region outside the divided regions.

Especially in the portion surrounded by the dotted line CR11, the sound pressure of the content A and the content B is higher than the background noise level indicated by a straight line L23, and those content sounds can be heard by people outside the divided regions.

Furthermore, in the example of FIG. 2, the portion surrounded by a dotted line CR12 is the region inside the region A, and the sound pressure of the content B is higher than the background noise level in this region. Therefore, in the vicinity of the boundary on the region B side in the region A, not only the sound of the content A but also the sound of the content B is leaked to and heard by the listener. That is, the sound of the content B leaks into the region A.

Similarly, the portion surrounded by a dotted line CR13 is the region inside the region B, but in this region, the sound pressure of the content A is higher than the background noise level, and the sound of the content A leaks into and is heard in the region B.

Such leaking sound is heard by the listener when the content sound in another divided region is large in a case where the content sound in the divided region is small or in a case of a silent section.

In general, in a case where the a leaking sound is a voice or music, the human hearing draws attention to those sounds, and it is unpleasant to half-hear the leaking sound.

In this way, in multi-zone reproduction, it is necessary to prevent people from perceiving the leaking sound by reducing the leakage of the content sound between the divided regions and the leakage of the content sound in the region outside the divided regions. For that purpose, the above-mentioned Patent Document 1 and Patent Document 2 have been proposed.

However, with the existing technologies, it has been difficult to easily make the leaking sound difficult to hear in multi-zone reproduction using a plurality of speakers.

For example, in Patent Document 1, it is not possible to cancel a content sound that is a leaking sound in a region other than the control point, which is a position where the sound is canceled, and an unintended content sound is leaked and heard around the control point.

Note that although it is possible to increase the number of control points in Patent Document 1, a huge number of speakers and microphones are required to make a leaking sound difficult to hear outside the divided region. Moreover, since the microphone must be installed at the control point, the increase in the number of control points becomes an obstacle to the layout of the microphone or the like during operation in the real space.

Furthermore, also in Patent Document 2, a huge number of speakers are required to reduce the leakage of content sounds.

Therefore, in the present technology, in a case where multi-zone reproduction is performed using wave field synthesis technology, that is, in a case where the reproduction space is divided into a plurality of divided regions and different pieces of content are reproduced in those divided regions, not only a content sound but also a masking sound is output simultaneously. Therefore, it is possible to easily make a leaking sound difficult to hear without increasing the number of speakers or using a huge number of microphones.

Note that, in determining the reproduction level of the masking sound, for example, external information or an external sensor can be used.

For example, as external information, visitor number information indicating the number of visitors (number of attendance) of a facility or venue where the content is reproduced, time zone information indicating the time zone when the content is reproduced, climate information indicating weather (climate) when the content is reproduced, and the like can be used.

By using such external information, it is possible to output a masking sound of an appropriate level according to the number of people, a time zone, the climate, and the like at the time of content reproduction, and mask the content sound that has become a leaking sound. That is, the masking sound makes the leaking sound difficult to hear.

Furthermore, as an external sensor used for determining the reproduction level of the masking sound, for example, a microphone or a camera can be adopted.

For example, since the level of ambient background noise can be estimated by using a microphone, the reproduction level of the masking sound can be appropriately determined according to the background noise level.

Similarly, since the number of people in the vicinity can be estimated by using a camera, the reproduction level of the masking sound can be appropriately determined according to the estimation result.

Note that the external information and the external sensor can be used not only for determining the reproduction level of the masking sound but also for determining the characteristics such as frequency characteristics of the masking sound.

Furthermore, the reproduction level of the masking sound may be varied according to the variation of the reproduction level of the content sound in the divided region.

For example, in a case where a microphone is used as an external sensor, the level of ambient background noise can be detected by using the microphone. Therefore, it is sufficient if the reproduction level of the content sound is changed according to the detection result of the background noise level and the reproduction level of the masking sound is determined according to the change in the reproduction level of the content sound.

Specifically, for example, it is conceivable to increase the reproduction level of the masking sound when the reproduction level of the content sound is high and conversely reduce the reproduction level of the masking sound when the reproduction level of the content sound is low.

Furthermore, it is also conceivable to increase the reproduction level of the masking sound when the difference between the reproduction level of the content sound and the background noise level is large and conversely reduce the reproduction level of the masking sound when the difference between the reproduction level of the content sound and the background noise level is small.

This is because when the difference between the reproduction level of the content sound and the background noise level is large, the content sound is heard loudly, and the reproduction level of the masking sound is increased by that amount such that the leaking sound becomes more difficult to hear.

Moreover, the levels of the content sound and the background noise may be compared for each frequency band to estimate the level at which the content sound leaks beyond the background noise in each frequency band, and, according to the estimation result, the reproduction level of the masking sound may be determined for each frequency band so that the leaking sound can be masked in terms of the auditory characteristics.

In addition, a microphone as an external sensor may be used to detect the level of ambient background noise, and the reproduction level of the masking sound may be determined on the basis of the detection result. In this case, the reproduction level of the content sound can be kept particularly unchanged.

Specifically, for example, it is conceivable to reduce the reproduction level of the masking sound when the background noise level is high and the leaking sound is difficult to hear, and conversely it is conceivable to increase the reproduction level of the masking sound when the background noise level is low.

Note that the reproduction level or characteristics of the masking sound may be determined by arbitrarily combining masking sound reproduction level control using the aforementioned external information, masking sound reproduction level control using an external sensor, masking sound reproduction level control according to the reproduction level of the content sound, and the like.

In such a case, it is possible to prepare in advance a parameter table in which, for example, a combination of external information or information obtained by using an external sensor is associated with a content sound reproduction level and a masking sound reproduction level for each combination. Then, it is possible to easily and appropriately determine the reproduction level of the content sound and the reproduction level of the masking sound, for example, by using the parameter table.

In addition, in order to determine the reproduction levels of the content sound and the masking sound, for example, external information or information obtained by using an external sensor may be an input, and a predictor that outputs the reproduction level of the content sound and the reproduction level of the masking sound, which are appropriate for the input, may be used. It is sufficient if such a predictor is generated in advance by machine learning represented by a neural network, for example.

Moreover, in a situation where a leaking sound is small and the leaking sound cannot be detected by a person in terms of hearing, the masking sound may not be reproduced (output).

Furthermore, by taking into consideration the background noise level, the reproduction level of the masking sound can be determined more appropriately. This is because in order to mask the leaking sound, it is better to set the reproduction level of the masking sound higher than the background noise level.

For example, in a case where the external information is used to determine the reproduction level of the masking sound, the background noise level can be estimated from the external information. Therefore, for example, when a reproduction level, which is preliminarily determined for given external information, is used as the reproduction level of the masking sound, the masking sound can be reproduced at a level higher than the background noise level estimated for the external information.

Furthermore, in a case where a camera is used as an external sensor, for example, face recognition or person detection can be performed on an image captured by the camera to estimate the number of people near the speaker that reproduces the content, and a level preliminarily determined for the estimation result can be set as the background noise level. In such a case, the reproduction level of the masking sound can be appropriately determined with respect to the background noise level.

Moreover, in a case where a microphone is used as an external sensor, an ambient sound can be collected by the microphone. The sound obtained by such sound collection includes at least background noise, but also includes a content sound depending on the timing of sound collection.

Therefore, sound collection using the microphone is performed only in the silent section of the content sound and the sound obtained by the sound collection is used as background noise such that the background noise level can be estimated more accurately.

In addition, in a case where a microphone is used as an external sensor, echo cancellation may be used to cancel the content sound being reproduced from the collected sound and extract only background noise. Even in this case, the background noise level can be estimated accurately.

Moreover, the characteristics such as the frequency characteristics of the masking sound for masking the leaking sound can be the same characteristics as crowd noise, bubble noise, pink noise, and the like. In this way, it is possible to mask the leaking sound without causing a sense of discomfort.

In addition, the frequency characteristics of the masking sound may be the same frequency characteristics as the sound collected by the microphone as an external sensor. Furthermore, the characteristics of the masking sound may be characteristics that erase the feature of the content sound, that is, characteristics that make the content sound difficult to hear.

Moreover, the region for reproducing the masking sound may be the entire region in which the system for reproducing the content can reproduce the sound.

Furthermore, by generating an acoustic beam having directivity as an acoustic beam (wave surface) of a masking sound by using wave field synthesis, the masking sound may be reproduced only in a region between a plurality of divided regions, or the masking sound may be reproduced in the region between the plurality of divided regions and in the region near the boundary in each divided region.

Moreover, in a case where a microphone is used as an external sensor, the microphone can be basically installed anywhere, but when the microphone is installed outside the divided region formed by wave field synthesis, for example, the levels of the background noise and the leaking sound can be estimated directly.

Configuration Example of the Content Reproduction System

Next, a more specific embodiment of the present technology described above will be described.

Figure 3:
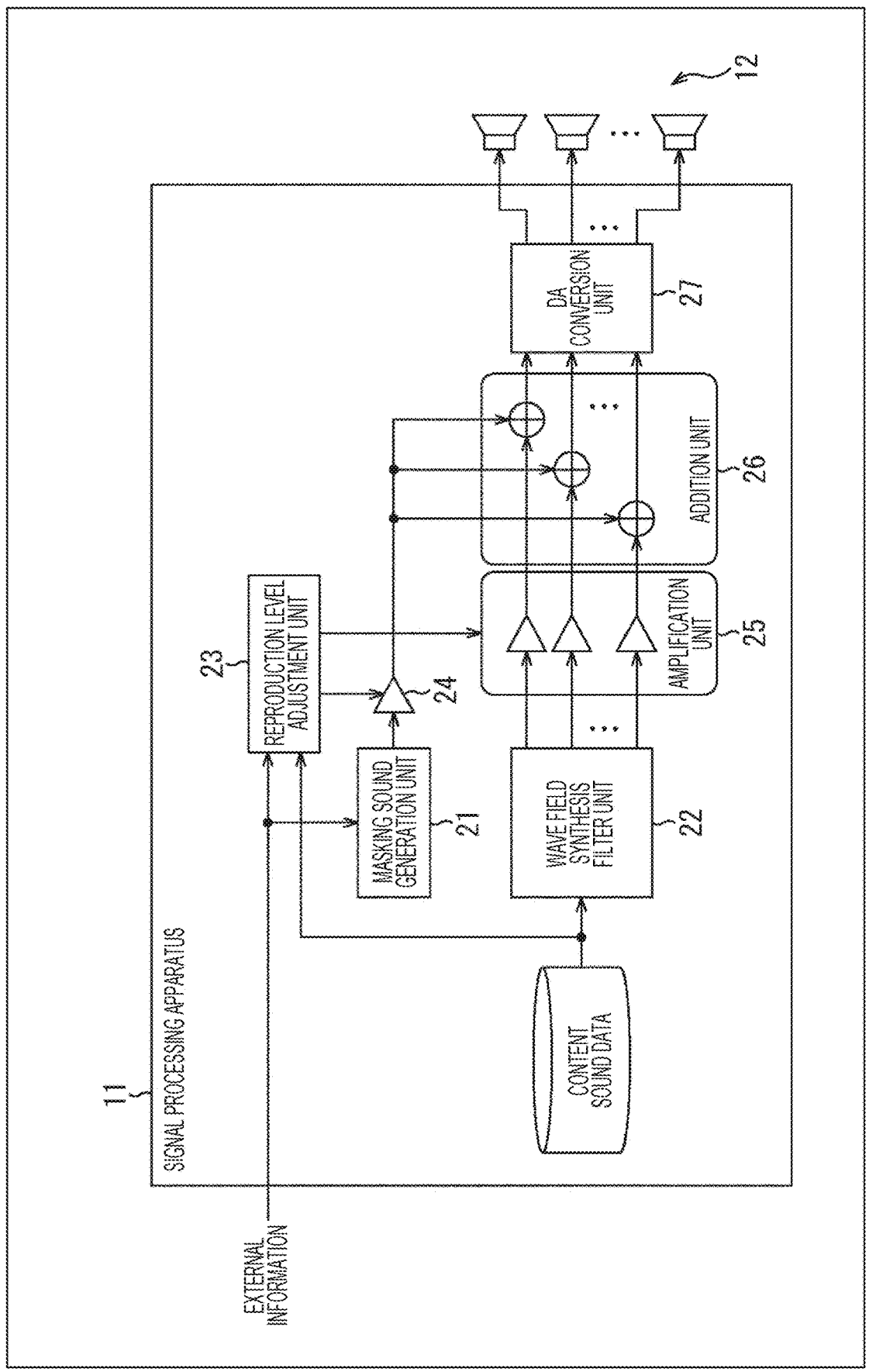
FIG. 3 is a diagram showing a configuration example a content reproduction system.

FIG. 3 is a diagram showing a configuration example of an embodiment of a content reproduction system to which the present technology has been applied.

The content reproduction system shown in FIG. 3 includes a signal processing apparatus 11 and a speaker array 12.

The signal processing apparatus 11 generates an output sound for reproducing the content sound and the masking sound, more specifically, an acoustic signal of the output sound, and supplies the acoustic signal to the speaker array 12.

The speaker array 12 includes, for example, a linear speaker array, an annular speaker array, a spherical speaker array, and the like including a plurality of speakers. Note that the speaker array 12 may be a speaker array having any shape.

The speaker array 12 reproduces a plurality of content sounds and a masking sound that masks an unintended content sound, that is, a leaking sound, at each position by outputting an output sound supplied from the signal processing apparatus 11.

Therefore, the content sound corresponding to each divided region is reproduced in multi-zone in each divided region within the reproduction space by wave field synthesis, and the masking sound is reproduced across the entire reproduction space. In multi-zone reproduction, the speaker array 12 outputs the output sound, so that the wave surface of the content sound is formed in the divided region in the reproduction space.

Note that, in the following, the entire space in which a sound can be reproduced by the speaker array 12 will be referred to as a reproduction space. Furthermore, here, it is assumed that the content to be reproduced in the reproduction space and the position and size of the divided region in which each content sound is reproduced are preliminarily determined. However, the content to be reproduced and the position and size of the divided region may not be preliminarily determined, but may be changed dynamically.

The signal processing apparatus 11 includes a masking sound generation unit 21, a wave field synthesis filter unit 22, a reproduction level adjustment unit 23, an amplification unit 24, an amplification unit 25, an addition unit 26, and a digital to analog (DA) conversion unit 27.

The masking sound generation unit 21 generates a masking sound on the basis of external information supplied from the outside and supplies it to the amplification unit 24.

The wave field synthesis filter unit 22 has in advance a wave field synthesis filter for reproducing the content only in the divided region by, for example, wave field synthesis.

Note that the wave field synthesis filter unit 22 may generate the wave field synthesis filter.

For generation of the wave field synthesis filter, the wave field synthesis filter is generated by calculation based on, for example, coordinate information indicating the position and size of the divided region for reproducing the content sound, the arrangement position of each speaker constituting the speaker array 12, and the like.

In wave field synthesis using such a wave field synthesis filter, the amplitude and phase of the output sound output from each speaker constituting the speaker array 12 are controlled by the filtering processing by the wave field synthesis filter, so that the wave surface of the sound in the reproduction space is physically replicated. That is, the wave surface of the content sound is formed only in the divided region.

Wave field synthesis is described in detail, for example, in Japanese Patent Application Laid-Open No. 2013-102389 and "Berkhout, Augustinus J., Diemer de Vries, and Peter Vogel. 'Acoustic control by wave field synthesis' The Journal of the Acoustical Society of America 93.5 (1993): 2764-2778." For example, in the wave field synthesis filter unit 22, it is sufficient if the techniques and the like described in these documents are used.

The wave field synthesis filter unit 22 performs filtering processing using the wave field synthesis filter on the supplied content sound data, that is, the acoustic signal for reproducing the content sound, and supplies the resulting output sound of each channel corresponding to each speaker constituting the speaker array 12 to the amplification unit 25.

More specifically, the wave field synthesis filter unit 22 has a wave field synthesis filter for each content, and performs filtering processing on the content sound data using the wave field synthesis filter for each content. Then, the wave field synthesis filter unit 22 adds the content sound of each content obtained by the filtering processing for each channel to obtain an output sound including each content sound. That is, the acoustic signals of the content sounds obtained for the same channel are added to obtain the acoustic signal of the output sound of that channel.

The reproduction level adjustment unit 23 controls the adjustment of the reproduction levels of the masking sound and the content sound on the basis of at least one of the external information supplied from the outside and the supplied content sound data.

That is, the reproduction level adjustment unit 23 determines the reproduction level of the masking sound on the basis of at least one of the external information and the content sound data, and supplies a masking sound gain coefficient for reproducing the masking sound at the determined reproduction level to the amplification unit 24.

Similarly, the reproduction level adjustment unit 23 determines the reproduction level of the content sound on the basis of at least one of the external information and the content sound data, and supplies a content sound gain coefficient for reproducing the content sound at the determined reproduction level to the amplification unit 25.

The amplification unit 24 includes an amplifier, and performs adjustment of the masking sound level by multiplying the masking sound supplied from the masking sound generation unit 21 by the masking sound gain coefficient supplied from the reproduction level adjustment unit 23 (gain adjustment). The amplification unit 24 supplies the masking sound after level adjustment to the addition unit 26.

The amplification unit 25 includes, for example, an amplifier provided for each channel corresponding to each speaker constituting the speaker array 12.

The amplification unit 25 performs adjustment of the level of an output sound, that is, a content sound by multiplying the output sound of each channel supplied from the wave field synthesis filter unit 22 by the content sound gain coefficient supplied from the reproduction level adjustment unit 23 (gain adjustment). The amplification unit 25 supplies the output sound after level adjustment to the addition unit 26.

The addition unit 26 includes, for example, an adder provided for each channel corresponding to each speaker constituting the speaker array 12.

The addition unit 26 adds the masking sound supplied from the amplification unit 24 to the output sound of each channel supplied from the amplification unit 25 to generate a final output sound of each channel and supplies it to the DA conversion unit 27.

The DA conversion unit 27 performs DA conversion on the output sound of each channel supplied from the addition unit 26, supplies an acoustic signal of the resulting output sound, which is an analog signal, of each channel to the speaker corresponding to each channel constituting the speaker array 12, and causes the speaker to output (reproduce) the output sound. Thus, it can be said that the DA conversion unit 27 functions as an output unit that causes the speaker array 12 to output the masking sound together with the content sound.

Regarding Generation of Masking Sound and Adjustment of Reproduction Level

Here, the generation of the masking sound and the adjustment of the reproduction level in the signal processing apparatus 11 will be described.

The external information supplied to the masking sound generation unit 21 and the reproduction level adjustment unit 23 can be, for example, at least any one of the visitor number information, the time zone information, day of week information indicating the day of the week when the content is reproduced, and the climate information, described above.

The masking sound generation unit 21 generates a masking sound according to the supplied external information, and the reproduction level adjustment unit 23 adjusts the reproduction levels of the masking sound and the content sound according to the external information.

Specifically, in a case where the day of week information and the time zone information are used as the external information, the masking sound generation unit 21 and the reproduction level adjustment unit 23 hold in advance, for example, a parameter table shown in FIG. 4.

In FIG. 4, the characters "day of week" and "time zone" indicate the day of week information and the time zone information, respectively.

Furthermore, the characters "content sound reproduction level" and "masking sound reproduction level" indicate the reproduction level of the content sound and the reproduction level of the masking sound, that is, the content sound gain coefficient and the masking sound gain coefficient, respectively. Further, the character "masking sound parameter" indicates a masking sound parameter which is information indicating the frequency characteristics of the masking sound.

The masking sound generation unit 21 refers to the parameter table and generates a masking sound indicated by a masking sound parameter preliminarily determined for the combination of the day of week information and the time zone information as the supplied external information.

For example, the masking sound parameter "air conditioning" indicates the frequency characteristics of an air conditioning sound, and the masking sound generated on the basis of this masking sound parameter "air conditioning" is regarded as a sound having the frequency characteristics similar to those of the air conditioning sound. Therefore, in a case where such a masking sound is reproduced, the person listening to it will hear the air conditioning sound.

Furthermore, the masking sound parameter "crowd+air conditioning" indicates the frequency characteristics of a mixed sound of crowd sound and air conditioning sound. Therefore, when the masking sound generated on the basis of the masking sound parameter "crowd+air conditioning" is reproduced, the person listening to it will hear the crowd sound and the air conditioning sound.

The masking sound generation unit 21 holds each masking sound parameter in advance together with such a parameter table.

The reproduction level adjustment unit 23 refers to the parameter table and supplies, to the amplification unit 25 and the amplification unit 24, a content sound gain coefficient and a masking sound gain coefficient that are preliminarily determined for the combination of the day of week information and the time zone information as the supplied external information.

The reproduction level adjustment unit 23 holds in advance the content sound gain coefficient and the masking sound gain coefficient together with the parameter table.

For example, in a case where the day of week information "Sunday" and the time zone information "8:00-12:00" are supplied as external information, the content sound is reproduced at 25 dB, and the masking sound similar to the air conditioning sound is reproduced at 3 dB.

In the example shown in FIG. 4, the reproduction level of the content sound is relatively low because the reproduction space is expected to be relatively quiet on days and times when there will be a small number of visitors, such as Sunday morning. As a result, the reproduction level of the masking sound is also low. Furthermore, in this case, since the reproduction space is expected to be relatively quiet, the masking sound is only the air conditioning sound.

On the other hand, for example, on Sunday afternoon, since it is expected that there will be many visitors, the reproduction level of the content sound is increased, and the reproduction level of the masking sound is also increased accordingly, and the masking sound is also the crowd sound and the air conditioning sound.

In addition, in a case where the visitor number information is used as external information, for example, when the number of visitors is large, the reproduction levels of the content sound and the masking sound may be increased, and the masking sound may be the crowd sound and the air conditioning sound.

Furthermore, for example, in a case where the content reproduction system is used outdoors with a roof and the climate information is used as external information, when the climate indicated by the climate information is rain, the leaking sound is masked to some extent by the rain sound included in the background noise.

Therefore, in such a case, the reproduction level of the content sound can be increased and the reproduction level of the masking sound can be reduced. Note that, in this case, the masking sound may not be reproduced. Furthermore, the masking sound may be a rain sound.

As described above, the signal processing apparatus 11 uses a parameter table in which the external information, the content sound gain coefficient, the masking sound gain coefficient, and the masking sound parameter are associated with each other to generate a masking sound or control adjustment of the reproduction levels of the content sound and the masking sound.

It can be said that such control is a control in which the reproduction level of the content sound is varied according to external information, and furthermore, the reproduction level of the masking sound is varied according to the variation in the reproduction level of the content sound.

In particular, in the example shown in FIG. 4, the reproduction level of the masking sound is increased when the reproduction level of the content sound is high and conversely the reproduction level of the masking sound is reduced when the reproduction level of the content sound is low.

Furthermore, the masking sound parameter held in advance in the masking sound generation unit 21 is generated by measuring in advance background noise such as air conditioning in the operating place of the content reproduction system and crowds when people come and go. For example, in the masking sound generation unit 21, Gaussian noise having frequency characteristics of background noise indicated by such a masking sound parameter is generated as a masking sound.

Note that the masking sound is not limited to Gaussian noise, and may be any other noise such as pink noise, white noise, crowd noise, bubble noise, and other general noise.

Furthermore, the masking sound generation unit 21 may use the content sound to generate a masking sound having characteristics that erase the feature of the content sound. That is, the frequency characteristics of the masking sound may be changed according to the frequency characteristics of the content sound. In such a case, the content sound data is supplied to the masking sound generation unit 21.

Specifically, for example, in a case where the content sound is a voice, the masking sound generation unit 21 analyzes the formant of the voice as the content sound and generates a masking sound having frequency characteristics that fill the valley of the frequency of the content sound. That is, a masking sound having the frequency characteristics that the level of the masking sound is increased is generated at the frequency where the level of the content sound is small among frequencies.

By reproducing such a masking sound together with the content sound, it is possible to erase the feature unique to the voice as the content sound leaking from the divided region, and it is possible to improve the masking effect. That is, it is possible to make it difficult to perceive that the leaking sound is a human voice.

Further, the reproduction level adjustment unit 23 may perform frequency analysis on the supplied content sound, and determine the reproduction level of the masking sound for each frequency band on the basis of the analysis result. In such a case, the level at which the content sound leaks beyond the background noise is estimated for each frequency band, and the reproduction level of the masking sound is determined for each frequency band so that the leaking sound is masked in terms of the auditory characteristics.

In addition to the parameter table, a predictor such as a neural network generated in advance by machine learning may be used.

In such a case, for example, the masking sound generation unit 21 obtains a masking sound parameter as an output by inputting external information into a predictor held in advance and performing a calculation, and generates a masking sound on the basis of the obtained masking sound parameter.

Furthermore, in this case, the reproduction level adjustment unit 23 inputs the external information and the content sound into the predictor held in advance and performs a calculation to obtain the content sound gain coefficient and the masking sound gain coefficient as outputs.

Regarding the Reproduction Range of Masking Sound

Moreover, in the signal processing apparatus 11 having the configuration shown in FIG. 3, for example, the entire reproduction space can be set as the reproduction range of the masking sound.

Figure 5:
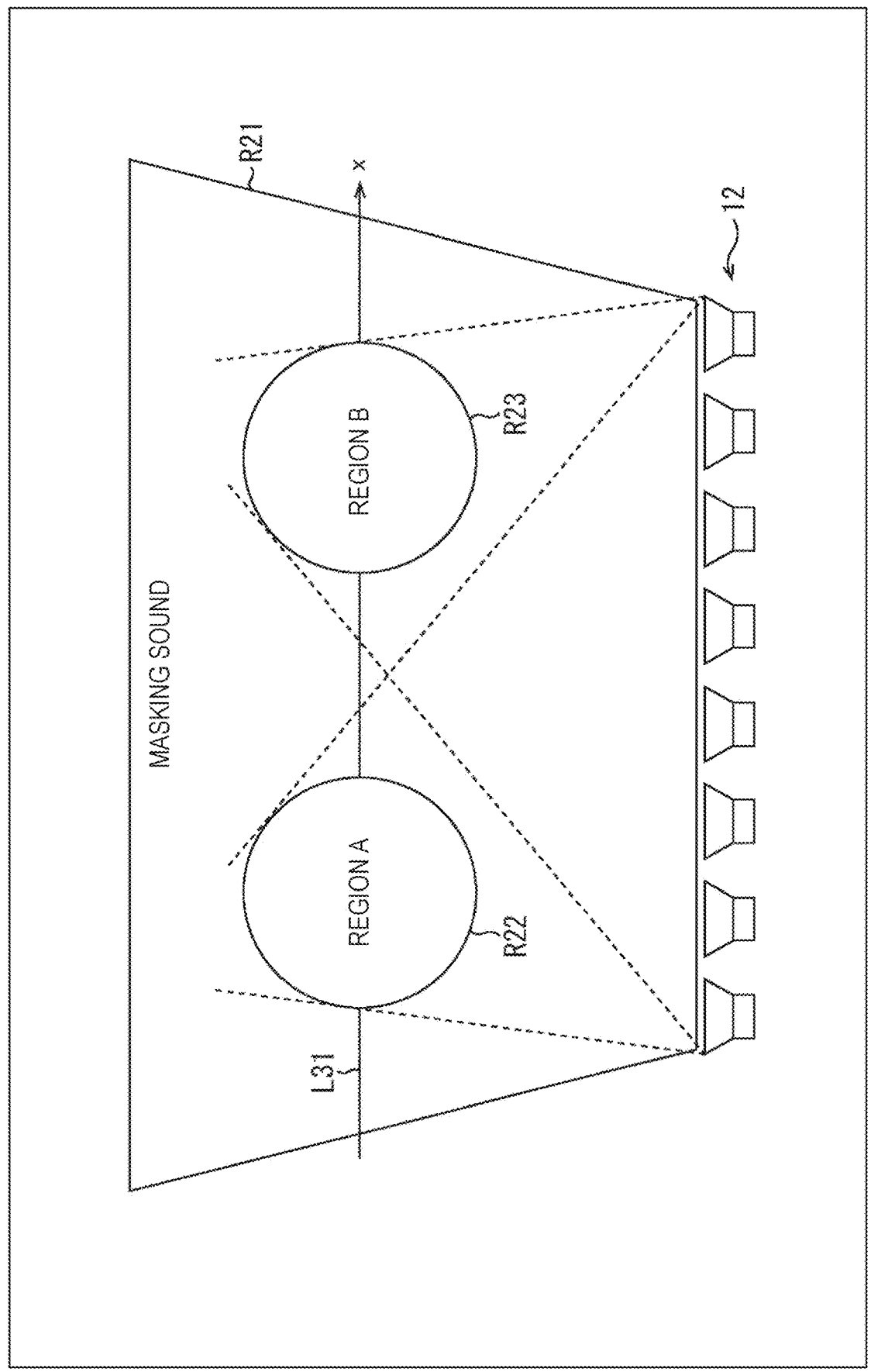
FIG. 5 is a diagram explaining divided regions and a reproduction range of masking sound.

Specifically, for example, as shown in FIG. 5, a region R21 in front of the speaker array 12 is assumed to be a reproduction space.

In this example, two divided regions R22 and R23 in which the content sound is reproduced are formed in the region R21 which is the entire region of the reproduction space. That is, the content A is reproduced in the divided region R22 corresponding to the above-mentioned region A, and the content B is reproduced in the divided region R23 corresponding to the region B.

Note that although the case where there are two divided regions is described here for the sake of simplicity of description, the number of divided regions may, of course, be three or more.

In the example of FIG. 5, the masking sound is reproduced in the entire region R21 including the divided region R22 and the divided region R23.

Figure 6:
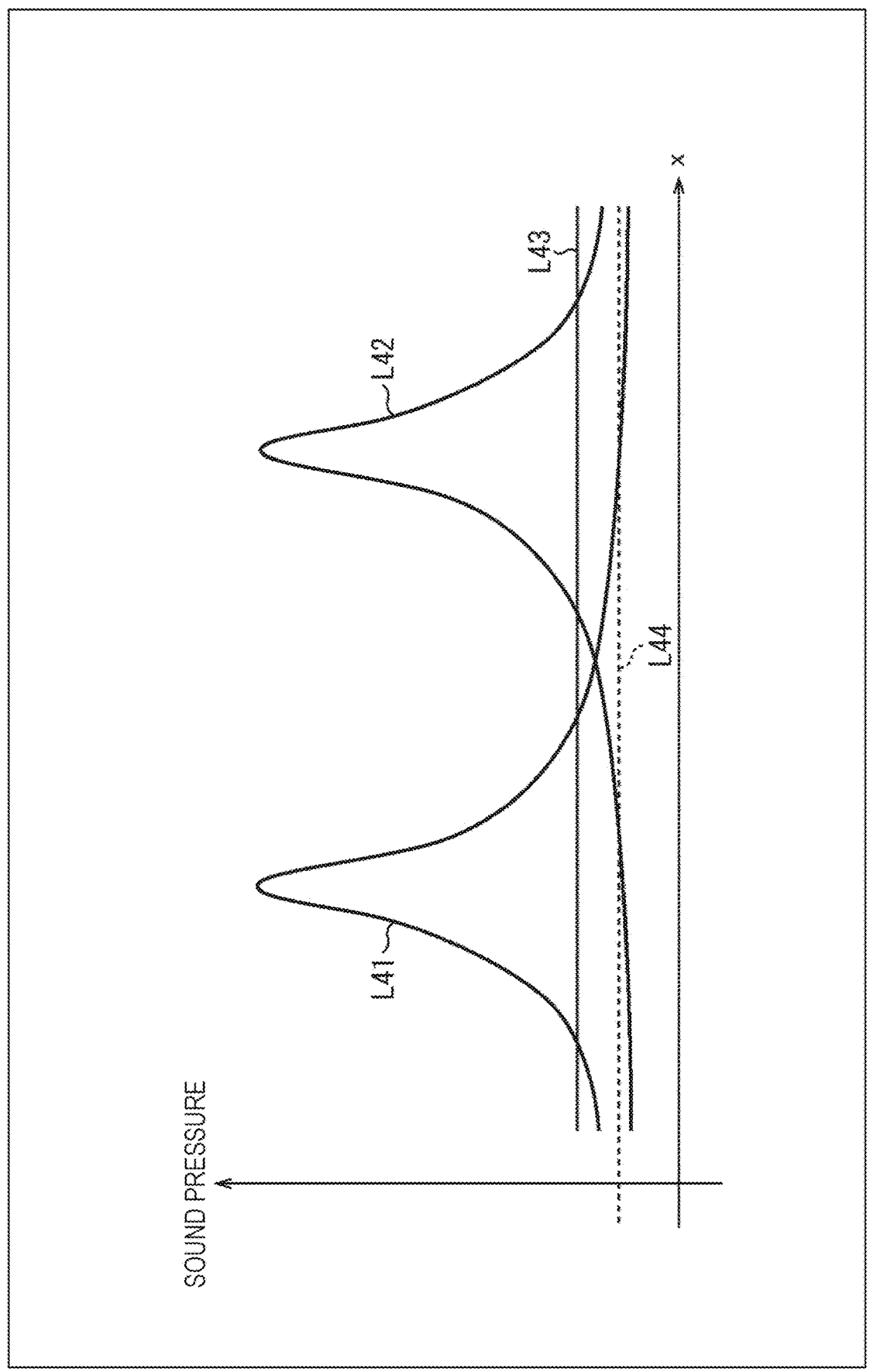
FIG. 6 is a diagram explaining a sound pressure distribution of content sound and masking sound.

In this case, the sound pressure distribution on the x-axis indicated by a straight line L31 in FIG. 5 is as shown in FIG. 6. Note that, in FIG. 6, the horizontal axis indicates the position in the x-axis direction, and the vertical axis indicates the sound pressure at each position.

In the example shown in FIG. 6, a curve L41 indicates the sound pressure distribution of the sound of the content A, and a curve L42 indicates the sound pressure distribution of the sound of the content B.

Furthermore, a straight line L43 indicates the sound pressure distribution of a masking sound, and a straight line L44 indicates the sound pressure level of background noise around the speaker array 12.

In this example, the masking sound has the same sound pressure (reproduction level) at each position in the reproduction space, and the reproduction level of the masking sound is set to be higher than the background noise level.

Therefore, it is possible to make a leaking sound larger than the background noise difficult to hear at each position of the reproduction space. In particular, here, not only in the region between the divided region R22 and the divided region R23, but also in the boundary portion inside the divided region R22 and the divided region R23, the level of the masking sound is higher than the content sound, which is a leaking sound, and it can be seen that the leaking sound is masked.

For example, when external information is used, the background noise level can be roughly estimated from the external information without practically measuring the background noise level. Therefore, in the method of determining the reproduction level of the masking sound on the basis of the external information and the parameter table, the masking sound can be reproduced at a reproduction level higher than the background noise level by setting the reproduction level of the masking sound to the reproduction level set with respect to the external information. The background noise also masks a small leaking sound, but by reproducing the masking sound at a reproduction level higher than the background noise level, the masking sound also masks a larger leaking sound, and the leaking sound can be made difficult to hear.

Description of the Content Reproduction Processing

Next, the content reproduction processing performed by the content reproduction system will be described. That is, the content reproduction processing by the content reproduction system will be described below with reference to the flowchart of FIG. 7. This content reproduction processing is started when a plurality of pieces of content is specified and the reproduction of those pieces of content is instructed.

In step S11, the masking sound generation unit 21 generates a masking sound on the basis of the external information supplied from the outside and the parameter table held in advance, and supplies the masking sound to the amplification unit 24.

For example, in step S11, the parameter table is referred to, and a masking sound is generated on the basis of the masking sound parameter associated with the external information.

In step S12, the wave field synthesis filter unit 22 performs filtering processing using the wave field synthesis filter on the supplied content sound data, and supplies the resulting output sound of each channel to the amplification unit 25.

For example, when the content A and the content B are specified as content to be reproduced, as shown in the example shown in FIG. 5, an output sound is generated by wave field synthesis in which the content A is reproduced only in the divided region R22 and the content B is reproduced only in the divided region R23.

In step S13, the reproduction level adjustment unit 23 determines the reproduction levels of the masking sound and the content sound on the basis of at least one of the supplied external information and the content sound data, and the held parameter table.

For example, in step S13, the parameter table is referred to, and the reproduction levels of the content sound and the masking sound are determined by specifying the gain coefficient associated with the external information. The reproduction level adjustment unit 23 supplies the determined masking sound gain coefficient to the amplification unit 24 and supplies the content sound gain coefficient to the amplification unit 25.

In step S14, the amplification unit 24 and the amplification unit 25 perform level adjustment.

That is, the amplification unit 24 performs level adjustment by multiplying the masking sound supplied from the masking sound generation unit 21 by the masking sound gain coefficient supplied from the reproduction level adjustment unit 23, and supplies the masking sound after level adjustment to the addition unit 26.

Furthermore, the amplification unit 25 performs level adjustment by multiplying the output sound of each channel supplied from the wave field synthesis filter unit 22 by the content sound gain coefficient supplied from the reproduction level adjustment unit 23, and supplies the output sound of each channel after level adjustment to the addition unit 26.

In step S15, the addition unit 26 performs addition processing of adding the masking sound supplied from the amplification unit 24 to the output sound of each channel supplied from the amplification unit 25, and supplies the resulting final output sound of each channel to the DA conversion unit 27.

In step S16, the DA conversion unit 27 performs DA conversion on the output sound of each channel supplied from the addition unit 26, supplies the resulting output sound of each channel to the speaker corresponding to each channel of the speaker array 12, and causes the speaker to reproduce the content sound.

Each speaker of the speaker array 12 outputs the output sound supplied from the DA conversion unit 27 to reproduce the content sound and reproduce the masking sound simultaneously.

Therefore, for example, multi-zone reproduction in which the content A is reproduced in the divided region R22 of FIG. 5 and the content B is reproduced in the divided region R23 is realized by wave field synthesis. At the same time, in the region R21 of the entire reproduction space, the masking sound is reproduced at a uniform sound pressure (reproduction level) at each position.

When the content sound is reproduced in this way, the content reproduction processing ends.

As described above, the content reproduction system generates a masking sound on the basis of the external information, and reproduces the masking sound together with the content sound. In this way, it is possible to easily make a leaking sound difficult to hear without increasing the number of speakers or using a huge number of microphones.

Second Embodiment

Configuration Example of the Content Reproduction System

Note that, in the above, an example in which the masking sound is reproduced at a uniform sound pressure (level) in the entire reproduction space has been described. However, it is not limited to the above, but the masking sound may be reproduced only in a specific region by using wave field synthesis.

Figure 8:
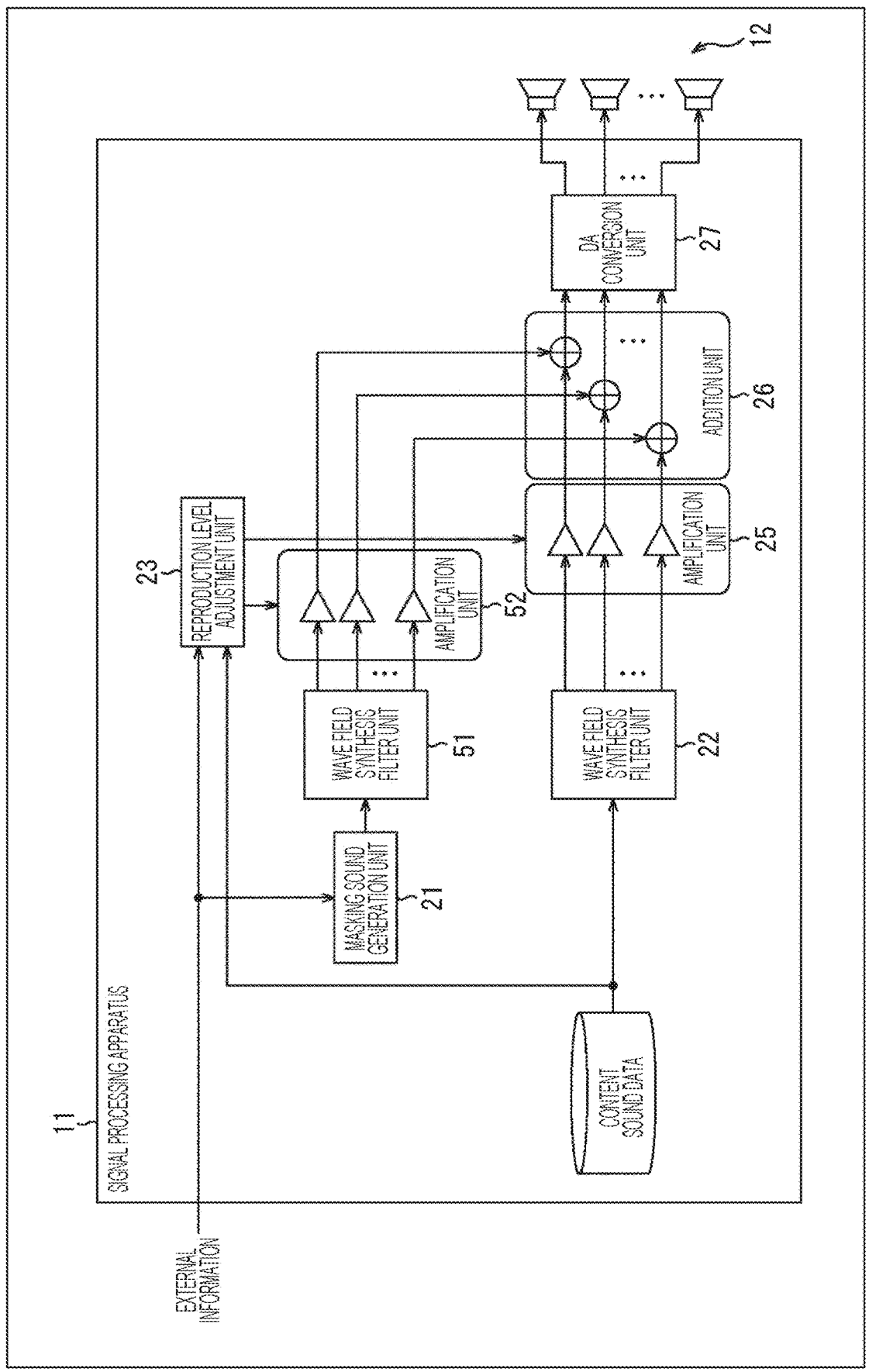
FIG. 8 is a diagram showing a configuration example of a content reproduction system.

In such a case, the content reproduction system is configured as shown in FIG. 8, for example. Note that portions in FIG. 8 corresponding to those of FIG. 3 are designated by the same reference numerals, and description is omitted as appropriate.

The content reproduction system shown in FIG. 8 includes a signal processing apparatus 11 and a speaker array 12. Furthermore, the configuration of the signal processing apparatus 11 shown in FIG. 8 differs from the configuration of the signal processing apparatus 11 shown in FIG. 3 in that a wave field synthesis filter unit 51 is newly provided and an amplification unit 52 is provided in place of the amplification unit 24 shown in FIG. 3, and has the same configuration as the signal processing apparatus 11 of FIG. 3 in other respects.

The wave field synthesis filter unit 51 has in advance a wave field synthesis filter for reproducing the masking sound only in a predetermined masking region by, for example, wave field synthesis. Note that the wave field synthesis filter unit 51 may generate the wave field synthesis filter.

Here, the masking region is a region for masking the content sound, that is, the leaking sound, and for example, the region between a plurality of divided regions is defined as the masking region.

The wave field synthesis filter unit 51 performs filtering processing using the wave field synthesis filter on the masking sound supplied from the masking sound generation unit 21, more specifically, the acoustic signal of the masking sound, and supplies the resulting masking sound of each channel to the amplification unit 52.

When the masking sound of each channel obtained in this way is output from each speaker of the speaker array 12, the wave surface of the masking sound is formed by wave field synthesis so that the masking sound is reproduced only in the target masking region.

In other words, when the masking sound of each channel is output from each speaker of the speaker array 12, an acoustic beam having directivity is generated as an acoustic beam of the masking sound by wave field synthesis, and as a result, the masking sound is reproduced only in the masking region.

By generating the masking sound of each channel for wave field synthesis in this way, the masking region can be divided, and the leaking sound of the content can be masked only in the target masking region. In other words, by setting the region where the leaking sound is generated as the masking region, it becomes possible to mask only the leaking sound.

The amplification unit 52 includes, for example, an amplifier provided for each channel corresponding to each speaker constituting the speaker array 12.

The amplification unit 52 performs level adjustment of the masking sound by multiplying the masking sound of each channel supplied from the wave field synthesis filter unit 51 by the masking sound gain coefficient supplied from the reproduction level adjustment unit 23, and supplies the masking sound after level adjustment to the addition unit 26.

The addition unit 26 adds the masking sound of each channel supplied from the amplification unit 52 to the output sound of each channel supplied from the amplification unit 25 to generate a final output sound of each channel and supplies it to the DA conversion unit 27. In the addition unit 26, the masking sound and the output sound of the same channel are added.

Regarding the Masking Region

In the signal processing apparatus 11 having the configuration shown in FIG. 8, the masking region, not the entire reproduction space, is defined as the reproduction range of the masking sound.

Figure 9:
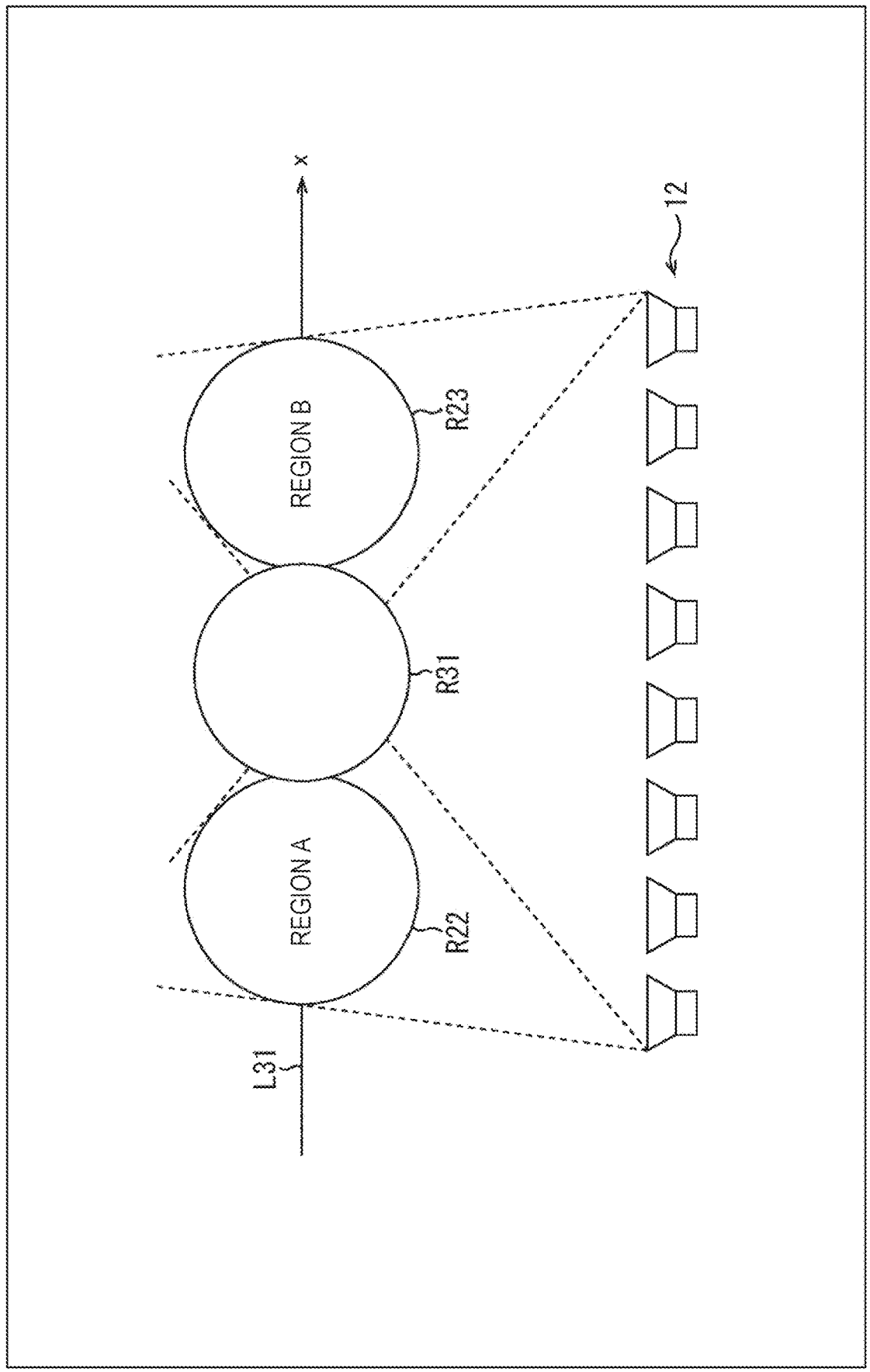
FIG. 9 is a diagram explaining divided regions and a masking region.

Specifically, for example, as shown in FIG. 9, a region in front of the speaker array 12 is assumed to be the reproduction space. Note that portions in FIG. 9 corresponding to those of FIG. 5 are designated by the same reference numerals, and description is omitted as appropriate.

In the example of FIG. 9, two divided regions R22 and R23 are formed in the reproduction space, and moreover the region between the divided region R22 and the divided region R23 is designated as a masking region R31. Therefore, in this example, the masking sound is reproduced only in the masking region R31 to mask the leaking sound, and the masking sound is not reproduced outside the masking region R31 and the leaking sound is not masked.

Figure 10:
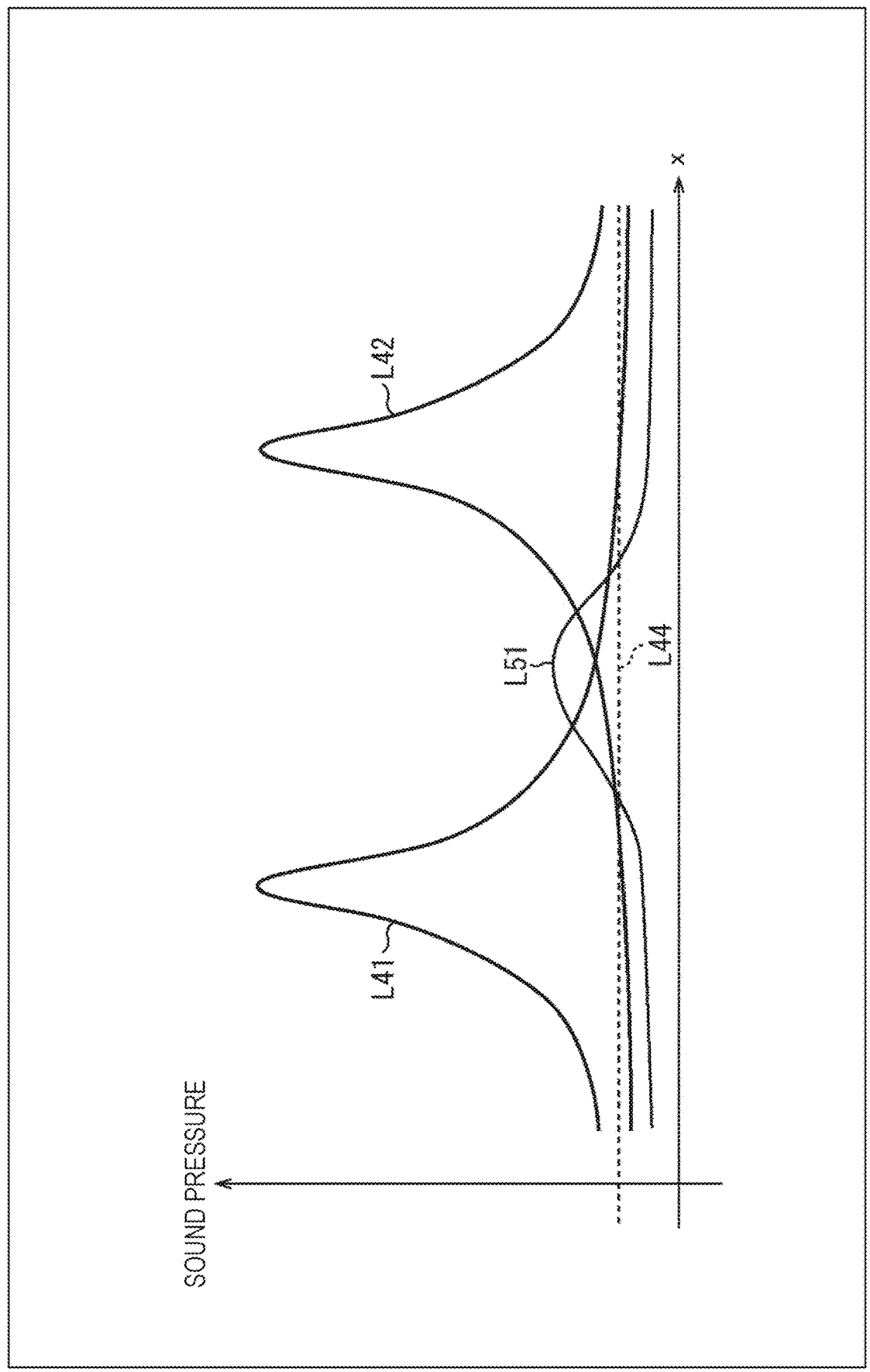
FIG. 10 is a diagram explaining a sound pressure distribution of content sound and masking sound.

In this case, the sound pressure distribution on the x-axis indicated by a straight line L31 in FIG. 9 is as shown in FIG. 10. Note that, in FIG. 10, the horizontal axis indicates the position in the x-axis direction, and the vertical axis indicates the sound pressure at each position. Furthermore, portions in FIG. 10 corresponding to those of FIG. 6 are designated by the same reference numerals, and description is omitted as appropriate.

In the example shown in FIG. 10, a curve L51 indicates the sound pressure distribution of the masking sound.

As shown by the curve L51, the sound pressure of the masking sound is larger than the background noise level only in the region between the divided region R22 and the divided region R23, that is, in the masking region R31, and it can be seen that the sound pressure is smaller than the background noise level outside the masking region R31. In other words, it can be seen that the wave field synthesis is used to mask the leaking sound by the masking sound only in the masking region R31.

Description of the Content Reproduction Processing

Figure 11:
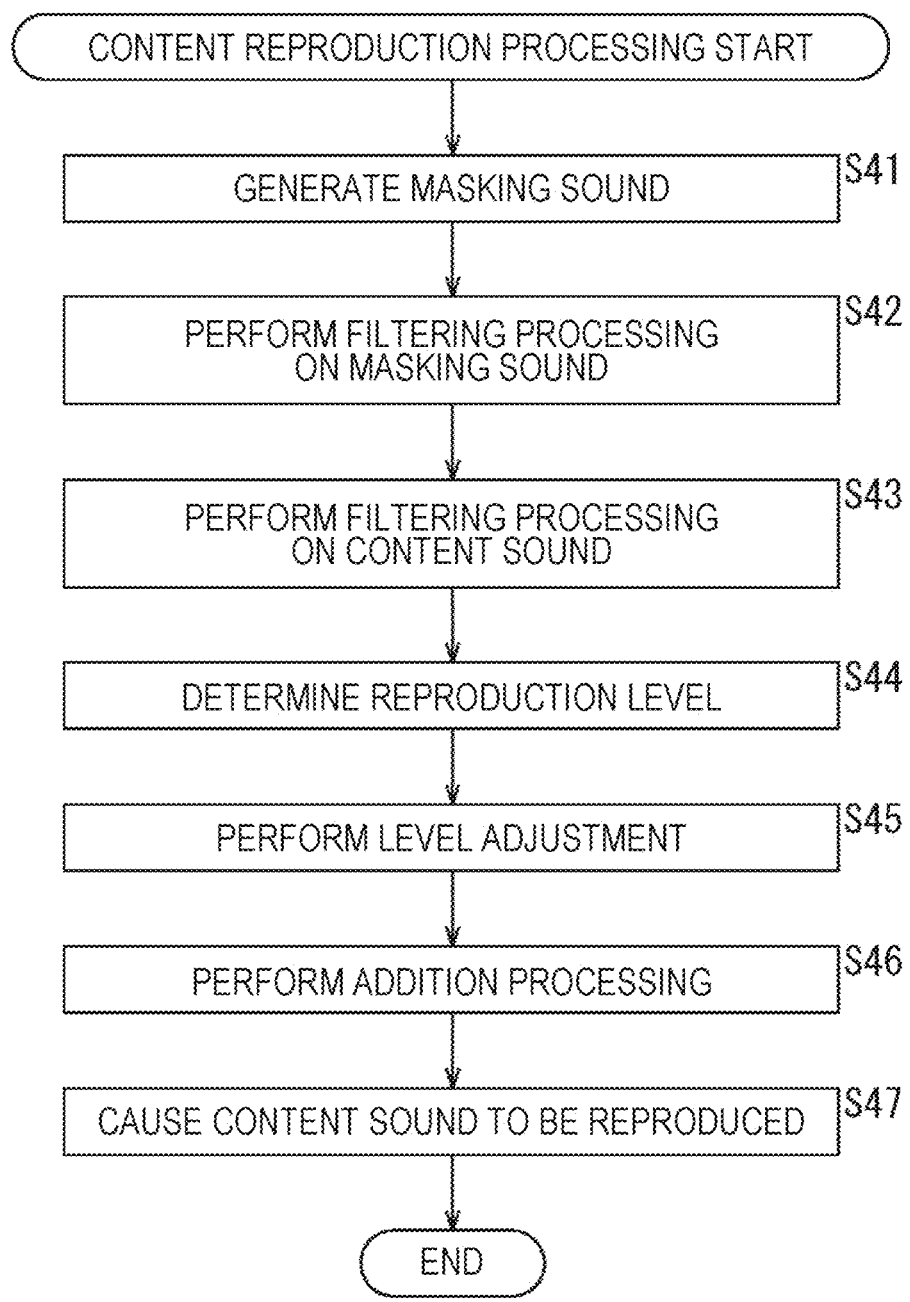
FIG. 11 is a flowchart explaining content reproduction processing.

In the content reproduction system shown in FIG. 8 as described above, the content reproduction processing shown in FIG. 11 is performed. That is, the content reproduction processing by the content reproduction system shown in FIG. 8 will be described below with reference to the flowchart of FIG. 11.

Figure 7:
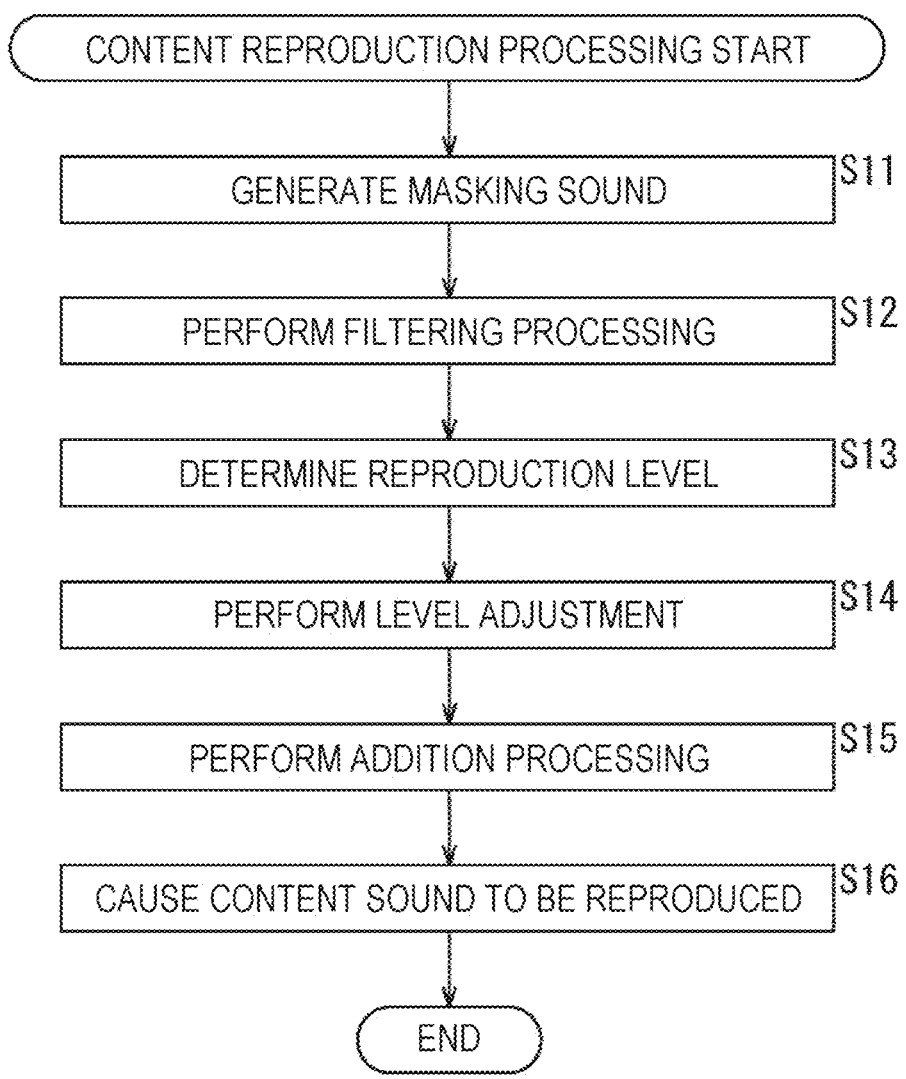
FIG. 7 is a flowchart explaining content reproduction processing.

When the content reproduction processing is started, the processing of step S41 is performed, but since the processing of step S41 is similar to the processing of step S11 of FIG. 7, the description thereof will be omitted.

In step S42, the wave field synthesis filter unit 51 performs filtering processing using the wave field synthesis filter on the masking sound supplied from the masking sound generation unit 21, and supplies the resulting masking sound of each channel to the amplification unit 52.

For example, when the content A and the content B are specified as content to be reproduced, as shown in the example shown in FIG. 9, the masking sound of each channel is generated such that the masking sound is reproduced only in the masking region R31 by wave field synthesis.

When the processing of step S42 is performed, the processing of steps S43 to S47 is performed thereafter and the content reproduction processing ends. This processing is similar to the processing of steps S12 to S16 of FIG. 7, the description thereof will be omitted.

However, in step S45, the amplification unit 52 adjusts the level of the masking sound of each channel, and the amplification unit 25 adjusts the level of the output sound of each channel. In step S46, the masking sound and the output sound are subjected to addition processing for each channel.

When the output sound of each channel is output in the speaker array 12, for example, as shown in FIG. 9, the content A is reproduced in the divided region R22, the content B is reproduced in the divided region R23, and the masking sound is reproduced in the masking region R31.

As described above, the content reproduction system generates a masking sound on the basis of the external information, and reproduces the masking sound together with the content sound by wave field synthesis. In this way, it is possible to easily make a leaking sound difficult to hear. Moreover, the leaking sound can be masked only in a desired masking region.

Third Embodiment

Configuration Example of the Content Reproduction System

Moreover, although the example of using the external information for generating the masking sound has been described above, the masking sound may be generated by using the output of the external sensor.

Figure 12:
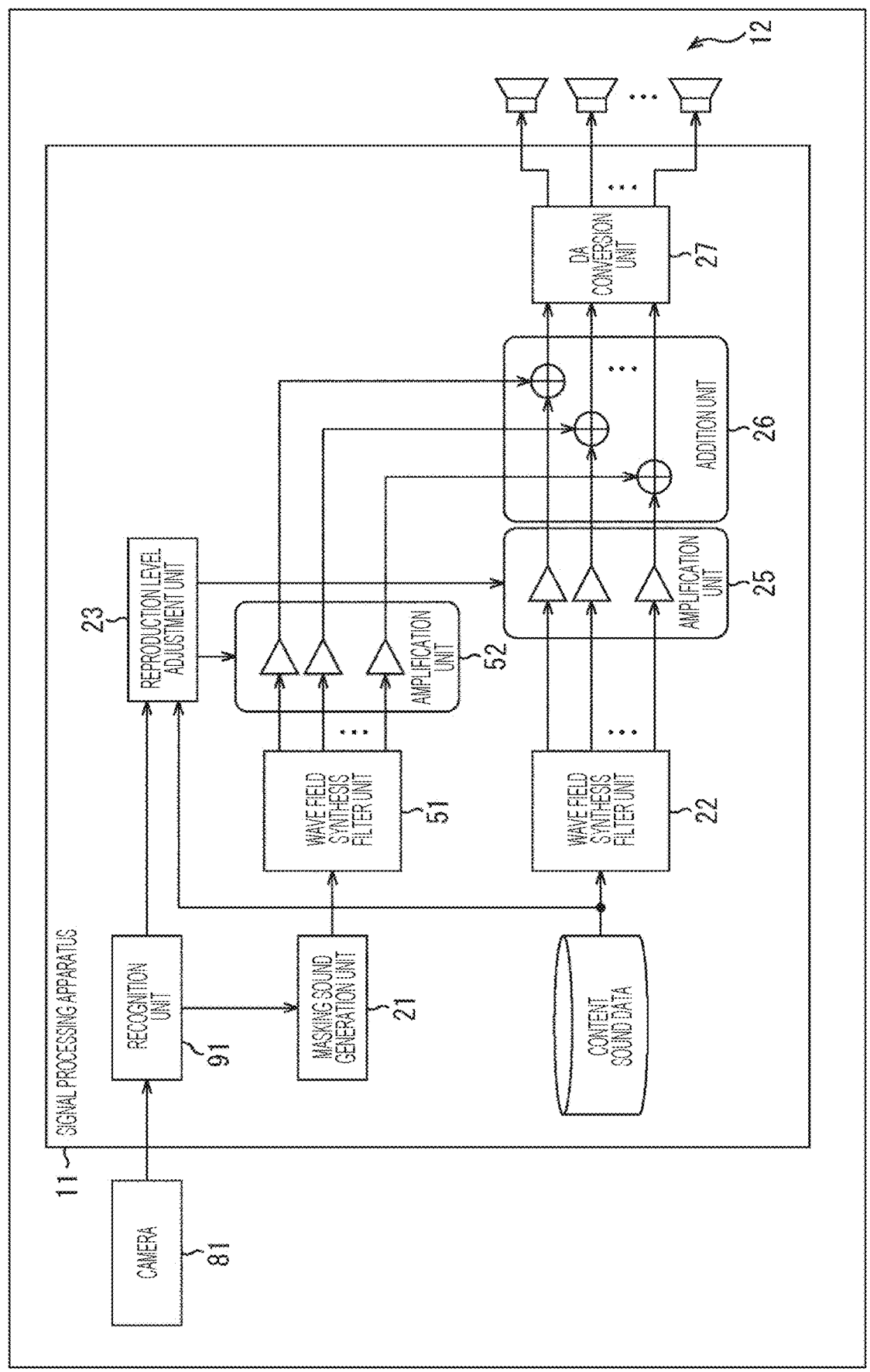
FIG. 12 is a diagram showing a configuration example of a content reproduction system.

For example, in a case where a camera is used as an external sensor, the content reproduction system is configured as shown in FIG. 12. Note that portions in FIG. 12 corresponding to those of FIG. 8 are designated by the same reference numerals, and description is omitted as appropriate.

The content reproduction system shown in FIG. 12 includes a camera 81, a signal processing apparatus 11, and a speaker array 12.

Furthermore, the configuration of the signal processing apparatus 11 shown in FIG. 12 has a configuration in which a recognition unit 91 is newly provided in addition to the configuration of the signal processing apparatus 11 shown in FIG. 8, and has the same configuration as the signal processing apparatus 11 of FIG. 8 in other respects.

The camera 81 provided as an external sensor is arranged in the reproduction space, for example, and captures the entire reproduction space or the region around the divided region as a subject, and supplies the resulting captured image to the recognition unit 91. For example, the captured image includes at least a region around the divided region as a subject.

The recognition unit 91 performs face recognition and person recognition on a captured image supplied from the camera 81 to detect a person from the captured image so as to estimate the number of people present around the content reproduction system, that is, across the entire reproduction space or around the divided region. In other words, the recognition unit 91 functions as a detection unit that detects a person from the captured image. The recognition unit 91 supplies the people number information indicating the number of people obtained as an estimation result of the number of people present around the content reproduction system, to the masking sound generation unit 21 and the reproduction level adjustment unit 23.

The masking sound generation unit 21 generates a masking sound on the basis of the people number information supplied from the recognition unit 91 and supplies it to the wave field synthesis filter unit 51.

Specifically, for example, in a case where the number of people indicated by the people number information is equal to or greater than a predetermined threshold value, that is, in a case where there are many people in the surroundings, there are many noise sources in the surroundings, the masking sound generation unit 21 generates Gaussian noise as the masking sound. This is because the greater the number of noise sources, the closer the background noise including the sounds of those noise sources is to the Gaussian noise.

On the other hand, for example, in a case where the number of people indicated by the people number information is less than a predetermined threshold value, that is, in a case where there are few people in the surroundings, the masking sound generation unit 21 generates Super Gaussian noise as the masking sound. This is because when the number of noise sources is small, the kurtosis of the frequency characteristics of background noise including the sounds of those noise sources becomes large.

Note that noise having frequency characteristics of kurtosis corresponding to the number of people indicated by the people number information may be generated as a masking sound. In addition, the people number information may be input into a predictor such as a neural network and a calculation may be performed to generate a masking sound having frequency characteristics obtained as the output, or external information and the people number information may be combined to generate a masking sound.

By generating a masking sound according to the number of people around in this way, it is possible to generate a masking sound having characteristics close to characteristics of background noise.

The reproduction level adjustment unit 23 determines the content sound gain coefficient and the masking sound gain coefficient on the basis of the people number information supplied from the recognition unit 91, and supplies the gain coefficients to the amplification unit 25 and the amplification unit 52.

Specifically, for example, the content sound gain coefficient is determined so that the reproduction level of the content sound increases as the number of people indicated by the people number information increases. This is because the more people around, the more the content sound becomes difficult to hear.

On the other hand, for example, the masking sound gain coefficient is determined so that the reproduction level of the masking sound decreases as the number of people indicated by the people number information increases. This is because the more people around, the higher the background noise level and the more the leaking sound becomes difficult to hear. Note that in a case where the number of people indicated by the people number information is equal to or greater than the predetermined number of people and the background noise level is estimated to be high, the masking sound may not be reproduced (generated).

In addition, in a case where there is a person only in the masking region, the reproduction level of the content sound may be set to a normal level, and the reproduction level of the masking sound may be increased.

It can be said that the adjustment of the masking sound reproduction level using such people number information is processing of determining an appropriate masking sound reproduction level with respect to the background noise level estimated from the people number information.

Note that in the reproduction level adjustment unit 23, similar to the case of the first embodiment, the content sound gain coefficient or the masking sound gain coefficient may be determined by using not only the people number information but also the content sound data.

Moreover, the people number information or the content sound data may be input into a predictor such as a neural network and a calculation may be performed to obtain a determination result of the reproduction levels of the content sound and the masking sound as the output, or the external information and the people number information may be combined to determine the reproduction levels of the content sound and the masking sound.

Description of the Content Reproduction Processing

Figure 13:
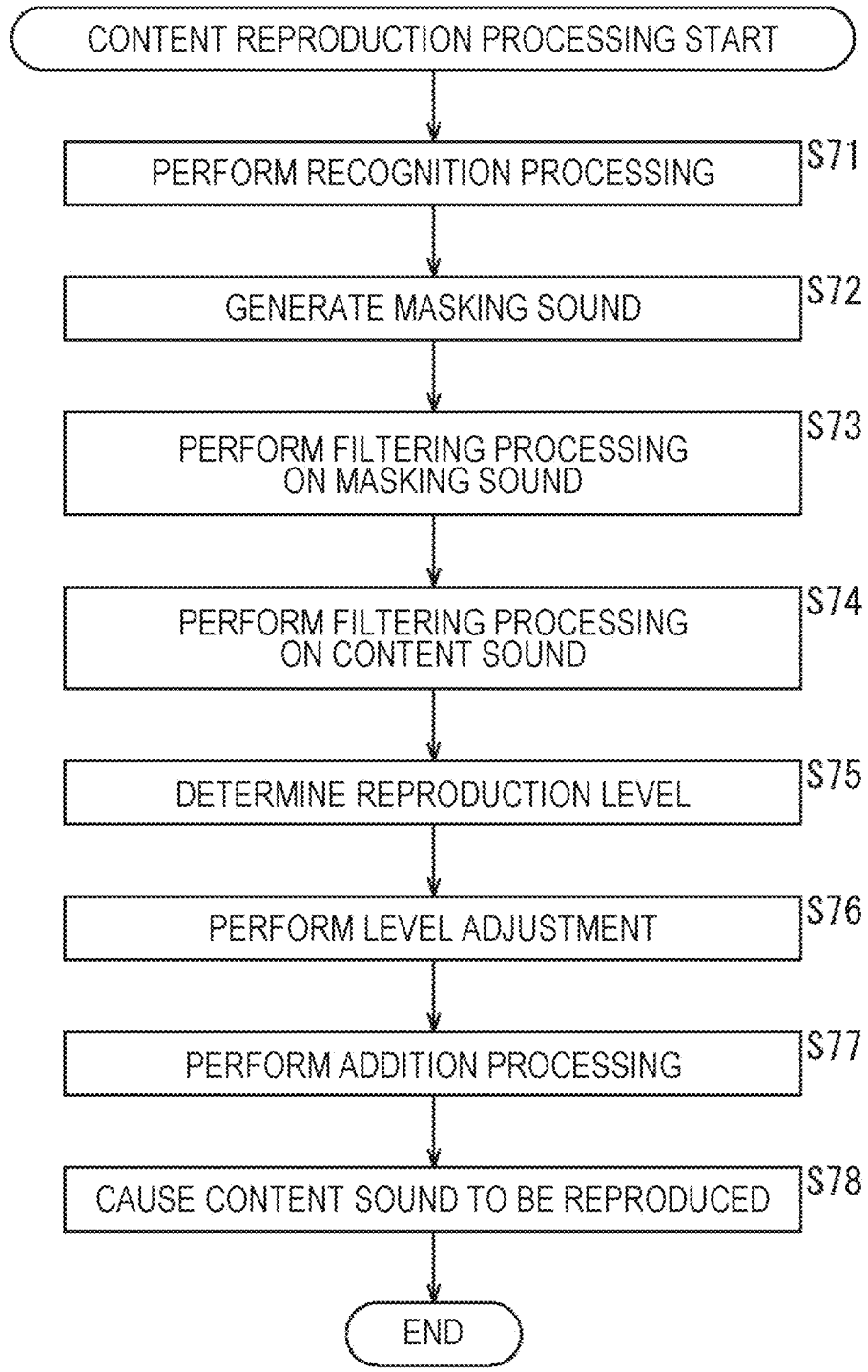
FIG. 13 is a flowchart explaining content reproduction processing.

In the content reproduction system shown in FIG. 12 as described above, the content reproduction processing shown in FIG. 13 is performed. That is, the content reproduction processing by the content reproduction system shown in FIG. 12 will be described below with reference to the flowchart of FIG. 13.

In step S71, the recognition unit 91 performs recognition processing on the basis of the captured image supplied from the camera 81, and supplies the resulting people number information to the masking sound generation unit 21 and the reproduction level adjustment unit 23.

In step S72, the masking sound generation unit 21 generates a masking sound on the basis of the people number information supplied from the recognition unit 91 and supplies it to the wave field synthesis filter unit 51.

For example, in step S72, Gaussian noise or Super Gaussian noise is generated as a masking sound depending on the people number information.

When the masking sound is generated, the masking sound is subsequently subjected to filtering processing in step S73, and the content sound is subjected to filtering processing in step S74. Note that since the processing is similar to the processing of steps S42 and S43 of FIG. 11, the description thereof will be omitted.

In step S75, the reproduction level adjustment unit 23 determines the reproduction level of the content sound and the reproduction level of the masking sound on the basis of the people number information supplied from the recognition unit 91.

For example, in step S75, the content sound gain coefficient and the masking sound gain coefficient are determined such that the larger the number of people indicated by the people number information, the higher the reproduction level of the content sound and the smaller the reproduction level of the masking sound.

When the reproduction levels of the content sound and the masking sound, that is, the gain coefficients are determined, the processing of steps S76 to S78 is performed thereafter and the content reproduction processing ends. This processing is similar to the processing of steps S45 to S47 of FIG. 11, the description thereof will be omitted.

As described above, the content reproduction system generates a masking sound on the basis of the people number information, adjusts the reproduction levels of the content sound and the masking sound, and reproduces the content sound and the masking sound by wave field synthesis. In this way, it is possible to easily make a leaking sound difficult to hear.

Fourth Embodiment

Configuration Example of the Content Reproduction System

Figure 14:
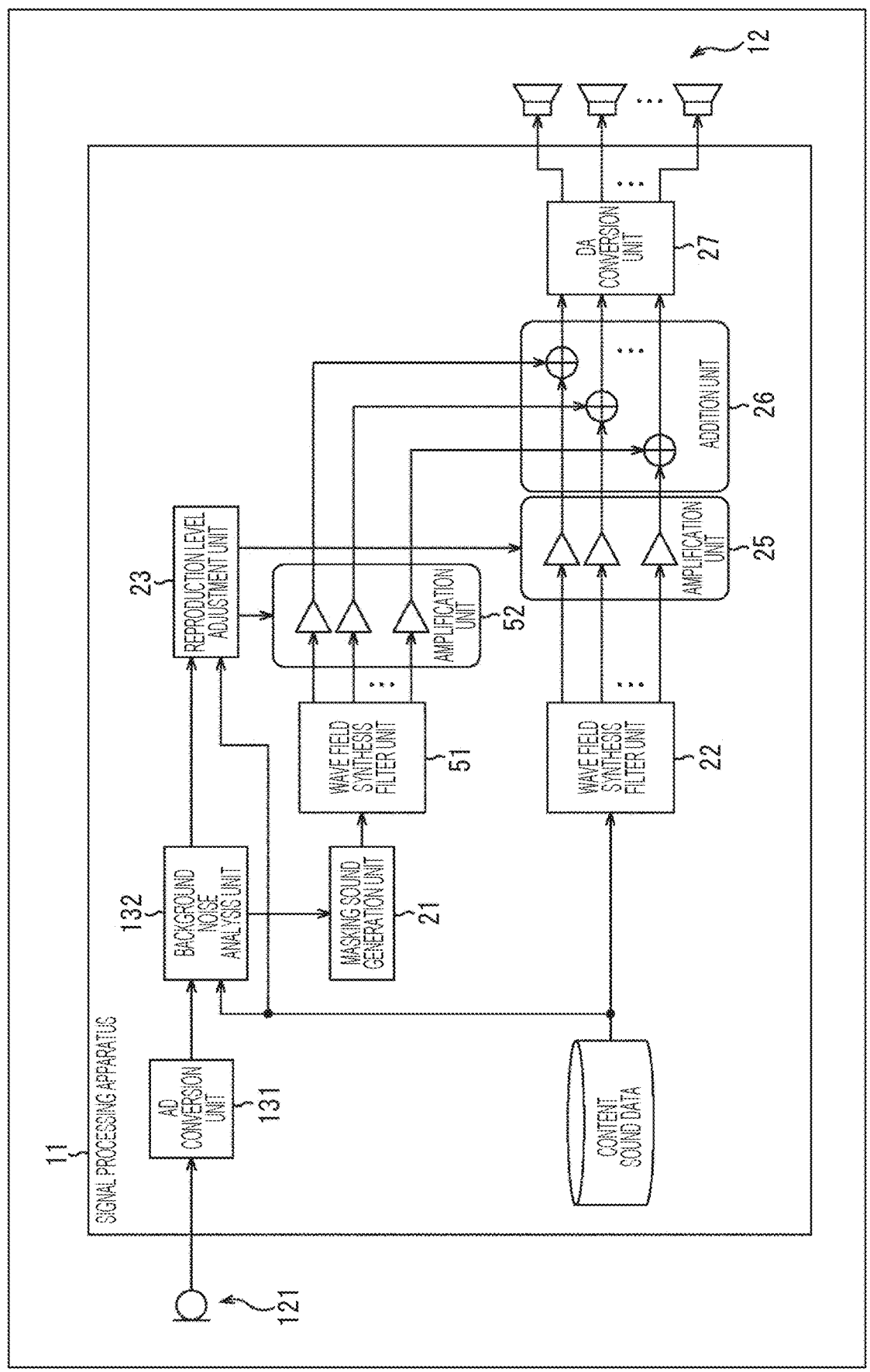
FIG. 14 is a diagram showing a configuration example of a content reproduction system.

Moreover, a microphone may be used as an external sensor. In such a case, the content reproduction system is configured as shown in FIG. 14, for example. Note that portions in FIG. 14 corresponding to those of FIG. 8 are designated by the same reference numerals, and description is omitted as appropriate.

The content reproduction system shown in FIG. 14 includes a microphone 121, a signal processing apparatus 11, and a speaker array 12.

Furthermore, the configuration of the signal processing apparatus 11 shown in FIG. 14 has a configuration in which an analog to digital (AD) configuration unit 131 and a background noise analysis unit 132 are newly provided in addition to the configuration of the signal processing apparatus 11 shown in FIG. 8, and has the same configuration as the signal processing apparatus 11 of FIG. 8 in other respects.

The microphone 121 as an external sensor is arranged at an arbitrary position in the reproduction space, for example, and acquires background noise in the reproduction space, for example, a region around the divided region. That is, the microphone 121 collects ambient sounds (hereinafter referred to as recorded sound) and supplies it to the AD conversion unit 131. Note that the number of microphones 121 may be one, but of course, a plurality of microphones 121 may be arranged.

The AD conversion unit 131 performs AD conversion on the recorded sound supplied from the microphone 121, and supplies the resulting digital recorded sound to the background noise analysis unit 132.

The background noise analysis unit 132 analyzes the level of the recorded sound supplied from the AD conversion unit 131, that is, analyzes the characteristics of the ambient background noise, on the basis of the content sound data supplied from the outside, and supplies the analysis result to the masking sound generation unit 21 and the reproduction level adjustment unit 23.

For example, in a state where the output sound is output by the speaker array 12, the recorded sound obtained by the microphone 121 includes not only ambient background noise but also content sounds and masking sounds.

Therefore, on the basis of the supplied content sound data, the background noise analysis unit 132 regards the recorded sound collected in the silent section where the content sound is silent, that is, the section where the content is not reproduced, as background noise. Then, the background noise analysis unit 132 performs analysis processing on the recorded sound in the section regarded as background noise. Note that it is assumed that the masking sound is not reproduced in the section where the content sound is silent.

Specifically, for example, the background noise level, which is the level of background noise, is calculated by the analysis processing, the frequency characteristics of the background noise are obtained by frequency analytics (frequency analysis), or the amplitude characteristics of the background noise are obtained. The background noise level and frequency characteristics obtained in this way are output from the background noise analysis unit 132 as the background noise analysis result.

The masking sound generation unit 21 generates a masking sound on the basis of the analysis result supplied from the background noise analysis unit 132 and supplies it to the wave field synthesis filter unit 51.

For example, the masking sound generation unit 21 may generate a masking sound on the basis of the parameter table similar to the first embodiment, or may generate a masking sound using a predictor such as a neural network.

The reproduction level adjustment unit 23 controls the adjustment of the reproduction levels of the masking sound and the content sound on the basis of at least one of the analysis result supplied from the background noise analysis unit 132 and the supplied content sound data.

That is, the reproduction level adjustment unit 23 determines the reproduction level of the masking sound, that is, the masking sound gain coefficient, on the basis of at least one of the analysis result and the content sound data, and supplies the determined gain coefficient to the amplification unit 52.

Similarly, the reproduction level adjustment unit 23 determines the reproduction level of the content sound, that is, the content sound gain coefficient, on the basis of at least one of the analysis result and the content sound data, and supplies the determined gain coefficient to the amplification unit 25.

For example, the reproduction level adjustment unit 23 may determine the gain coefficient on the basis of the parameter table similar the first embodiment, or may determine the gain coefficient using a predictor such as a neural network.

Here, as a specific example, a case where the masking sound is generated and the gain coefficient is determined on the basis of the parameter table will be described. In such a case, for example, the masking sound generation unit 21 and the reproduction level adjustment unit 23 hold in advance a parameter table shown in FIG. 15.

In FIG. 15, the character "background noise sound pressure" indicates the background noise level obtained as an analysis result by the background noise analysis unit 132, that is, the measured background noise sound pressure.

Furthermore, the characters "content sound reproduction level" and "masking sound reproduction level" indicate the reproduction level of the content sound and the reproduction level of the masking sound, that is, the content sound gain coefficient and the masking sound gain coefficient, respectively. Further, the character "masking sound parameter" indicates a masking sound parameter.

For example, the masking sound parameter "air conditioning" indicates the frequency characteristics of the air conditioning sound similar to the case of FIG. 4, and the masking sound parameter "frequency characteristics of the microphone acquisition sound" indicates the frequency characteristics of the recorded sound as background noise.

Note that the masking sound generation unit 21 does not hold the masking sound parameter "frequency characteristics of the microphone acquisition sound" in advance, and the frequency characteristics of the background noise supplied as the analysis result from the background noise analysis unit 132 are used as the masking sound parameter "frequency characteristics of the microphone acquisition sound".

In this case, Gaussian noise corresponding to the frequency characteristics of background noise as a masking sound parameter may be generated as masking sound.

When the masking sound is generated on the basis of the masking sound parameter "frequency characteristics of the microphone acquisition sound", the masking sound having the same frequency characteristics as the actual background noise can be obtained, and the leaking sound can be naturally masked without causing a sense of discomfort.

Furthermore, focusing on the reproduction levels of the content sound and the masking sound, the reproduction level of the content sound and the reproduction level of the masking sound increase as the background noise level increases.

In the example shown in FIG. 15, for example, in a case where the background noise level, that is, the background noise sound pressure "60 dBA" is obtained as the analysis result of the background noise, the content sound is reproduced at 10 dB, and the masking sound similar to the air conditioning sound is reproduced at 3 dB.

In a case where such a parameter table shown in FIG. 15 is used, control is performed such that the reproduction level of the content sound changes according to the background noise level and furthermore the reproduction level of the masking sound is determined according to the change in the reproduction level of the content sound.

Note that in a case where the masking sound parameter and the gain coefficient (reproduction level) are determined using the parameter table, not only the information obtained from the output of the external sensor such as the analysis result of the background noise but also the external information may be used in combination.

In such a case, for example, for the combination of the analysis result of the background noise and the external information, a parameter table in which the reproduction level (gain coefficient) of the content sound or the masking sound is associated with and the masking sound parameter can be used. In other words, the gain coefficients of the content sound and the masking sound and the masking sound parameter can be determined on the basis of the analysis result of the background noise and the external information.

Description of the Content Reproduction Processing

Figure 16:
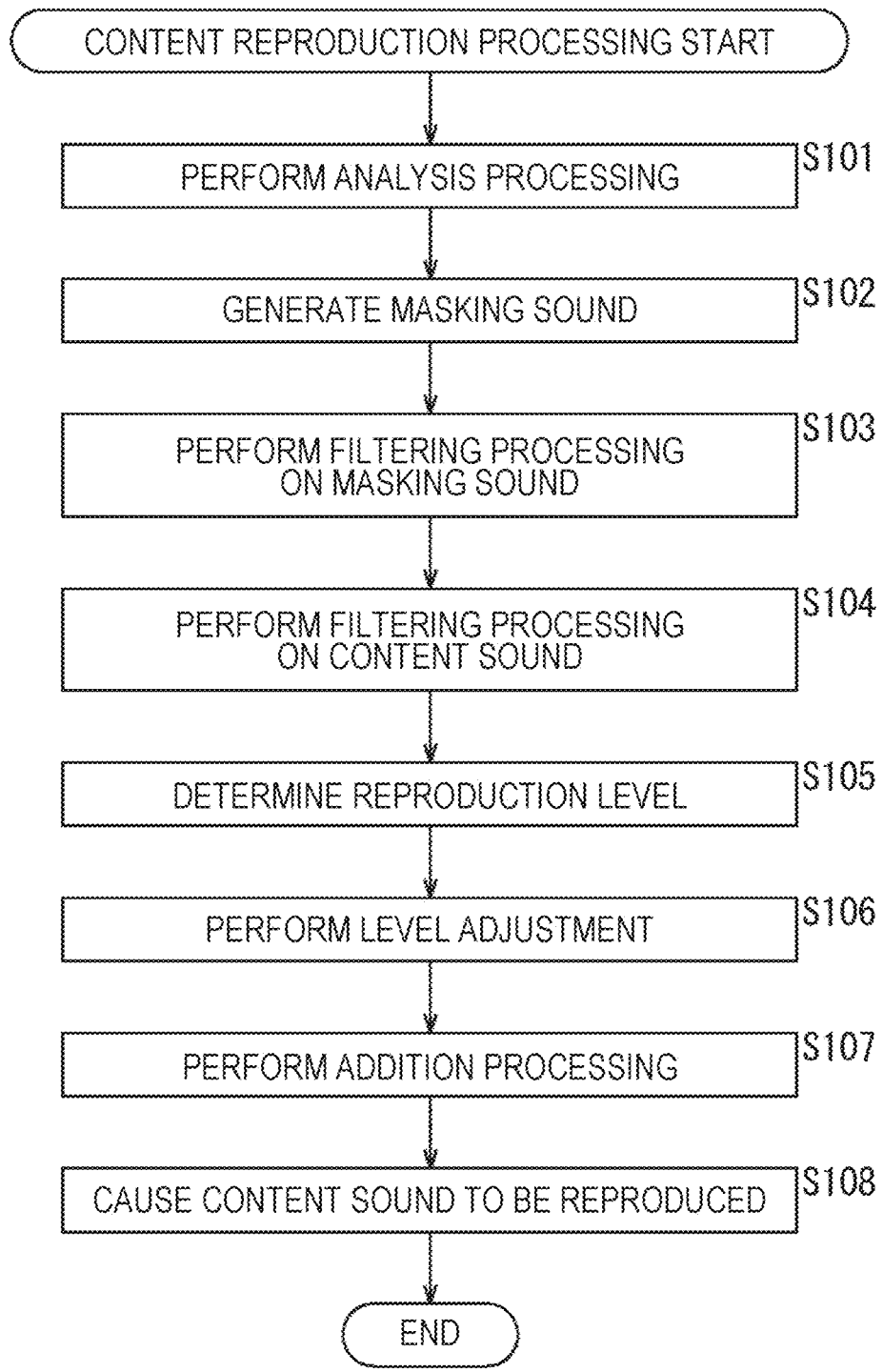
FIG. 16 is a flowchart explaining content reproduction processing.

In the content reproduction system shown in FIG. 14 as described above, the content reproduction processing shown in FIG. 16 is performed. That is, the content reproduction processing by the content reproduction system shown in FIG. 14 will be described below with reference to the flowchart of FIG. 16.

In step S101, the background noise analysis unit 132 performs analysis processing on the recorded sound supplied from the AD conversion unit 131, that is, the background noise in the silent section where the content sound is silent, on the basis of the supplied content sound data, and supplies the analysis result to the masking sound generation unit 21 and the reproduction level adjustment unit 23. Here, as the background noise analysis result, for example, the background noise level, frequency characteristics, amplitude characteristics, and the like can be obtained.

In step S102, the masking sound generation unit 21 generates a masking sound on the basis of the analysis result supplied from the background noise analysis unit 132 and the parameter table held in advance, and supplies the masking sound to the wave field synthesis filter unit 51.

For example, in step S102, the parameter table is referred to, and a masking sound is generated on the basis of the masking sound parameter associated with the background noise analysis result.

When the masking sound is generated, the masking sound is subsequently subjected to filtering processing in step S103, and the content sound is subjected to filtering processing in step S104. Note that since the processing is similar to the processing of steps S42 and S43 of FIG. 11, the description thereof will be omitted.

In step S105, the reproduction level adjustment unit 23 determines the reproduction levels of the masking sound and the content sound on the basis of at least one of the supplied content sound data and the analysis result supplied from the background noise analysis unit 132, and the held parameter table.

For example, in step S105, the parameter table is referred to, and the reproduction levels of the content sound and the masking sound, that is, the gain coefficients, are determined by specifying the gain coefficients associated with the background noise analysis result.

The reproduction level adjustment unit 23 supplies the determined masking sound gain coefficient to the amplification unit 52 and supplies the content sound gain coefficient to the amplification unit 25.

When the reproduction level is determined, the processing of steps S106 to S108 is performed thereafter and the content reproduction processing ends. This processing is similar to the processing of steps S45 to S47 of FIG. 11, the description thereof will be omitted.

As described above, the content reproduction system generates a masking sound on the basis of the background noise analysis result, adjusts the reproduction levels of the content sound and the masking sound, and reproduces the content sound and the masking sound by wave field synthesis. In this way, it is possible to easily make a leaking sound difficult to hear.

Variation Example 1 of the Fourth Embodiment

Other Examples of the Parameter Table

Furthermore, in a case where the microphone 121 is used as the external sensor, the microphone 121 can be arranged in the region between the plurality of divided regions. Then, a mixture sound including the content sound reproduced in each divided region, the background noise, and the masking sound can be obtained as the recorded sound by the microphone 121.

In this case, by analyzing the recorded sound, it is possible to determine how much more masking sound should be added, that is, how much the reproduction level of the masking sound should be increased in order to reliably mask the leaking sound by calculation.

Specifically, for example, the background noise analysis unit 132 sets the content sound as S (signal) and the mixed sound of background noise and masking sound as N (noise). That is, the background noise analysis unit 132 obtains the difference between the sound pressure of the recorded sound when the content sound is being reproduced and the sound pressure of the recorded sound when the content sound is not being reproduced as the SN ratio.

Then, in a case where the obtained SN ratio is larger than 0 dB, the background noise analysis unit 132 determines that the content sound level is superior, that is, the leaking sound is generated, so that the masking sound is further added and the reproduction level of the masking sound is increased.

On the other hand, in a case where the obtained SN ratio is smaller than 0 dB, the background noise analysis unit 132 determines that the level of the mixed sound of the masking sound and the background noise is superior, that is, the leaking sound is already inaudible, and the reproduction level of the masking sound is reduced.

By dynamically changing the reproduction level of the masking sound in this way, the masking sound can be reproduced at an appropriate reproduction level according to the surrounding environment and the like.

The adjustment control of the reproduction level of the masking sound as described above can be realized by using, for example, a parameter table shown in FIG. 17.

In FIG. 17, the character "SN ratio" indicates the above-mentioned SN ratio calculated on the basis of the sound pressure of the recorded sound obtained as the analysis result by the background noise analysis unit 132.

Furthermore, the character "content sound reproduction level" indicates the reproduction level of the content sound, that is, the content sound gain coefficient.

Further, the character "masking sound reproduction level variation" indicates an increase/decrease value of the reproduction level of the masking sound, and the character "masking sound parameter" indicates a masking sound parameter.

For example, the masking sound reproduction level variation "−6 dB" indicates that the reproduction level of the masking sound is reduced by −6 dB from the current level. In the example shown in FIG. 17, the reproduction level of the masking sound increases or decreases according to the SN ratio, and in a case where the SN ratio is 0 dB, it is assumed that the reproduction level of the masking sound at the current point of time is an appropriate level, and the reproduction level is maintained. That is, the increase/decrease value is 0 dB.

Therefore, the reproduction level adjustment unit 23 increases or decreases the reproduction level of the masking sound by the increase/decrease value corresponding to the SN ratio supplied from the background noise analysis unit 132 with reference to the parameter table. That is, the reproduction level adjustment unit 23 determines a new masking sound gain coefficient according to the increase/decrease value of the reproduction level of the masking sound, and supplies the new gain coefficient to the amplification unit 52.

In a case where the parameter table shown in FIG. 17 is held in the masking sound generation unit 21 and the reproduction level adjustment unit 23, the SN ratio is calculated in step S101 of the content reproduction processing described with reference to FIG. 16.

That is, the background noise analysis unit 132 calculates the SN ratio based on the recorded sound obtained at the timing when the content sound is not reproduced and the recorded sound obtained at the timing when the content sound is reproduced, as background noise analysis, and supplies the obtained SN ratio to the masking sound generation unit 21 and the reproduction level adjustment unit 23.

Then, in step S102, the masking sound generation unit 21 determines the masking sound parameter on the basis of the SN ratio supplied from the background noise analysis unit 132 and the held parameter table, and generates a masking sound according to the determination result.

Furthermore, in step S105, the reproduction level adjustment unit 23 determines the reproduction levels of the content sound and the masking sound, that is, the gain coefficients, on the basis of the SN ratio supplied from the background noise analysis unit 132 and the held parameter table.

For example, in the example shown in FIG. 17, the content sound gain coefficient is determined so that the reproduction level of the content sound is always 20 dB. Furthermore, regarding the masking sound, a gain coefficient corresponding to the reproduction level specified with respect to the reproduction level of the masking sound at the current point of time and an increase/decrease value corresponding to the SN ratio is determined.

By varying the reproduction level of the masking sound according to the SN ratio, that is, the relationship between the sound pressure of the content sound and the mixed sound of the background noise and the masking sound, the masking sound can be reproduced at a more appropriate reproduction level, and the leaking sound can be reliably masked.

The control of the masking sound reproduction level based on the SN ratio as described above can be said to be control that increases and decreases the reproduction level of the masking sound according to the difference between the background noise level, more specifically, the levels of the background noise and the masking sound, and the reproduction level of the content sound.

Note that, here, an example of determining the masking sound parameter and the reproduction level of the masking sound using the SN ratio and the parameter table has been described, but a predictor such as a neural network generated in advance by machine learning may be used.

In addition, in a case where the background noise level can be obtained by analyzing the recorded sound, the background noise analysis unit 132 may compare the content sound and the background noise level for each frequency band, and the reproduction level adjustment unit 23 may determine the reproduction level of the masking sound for each frequency band according to the comparison result. In this case, since the level at which the content sound leaks beyond the background noise can be estimated for each frequency band, the leaking sound can be more reliably masked in terms of auditory characteristics.

Fifth Embodiment

Configuration Example of the Content Reproduction System

By the way, for example, in the fourth embodiment described above and Variation Example 1 of the fourth embodiment, the background noise level is calculated from the recorded sound at the timing of the silent section, and the recorded sound mixed with the content sound is used for analysis.

However, in a case where the content sound is sustained and there is no silent section or there are few silent sections, for example, in a case where the content is music, it is difficult to acquire only the background noise as the recorded sound. Furthermore, it is also assumed that the microphone 121 cannot be installed at a position between the divided regions.

Therefore, it may be possible to acquire only the recorded sound that does not include the content sound, that is, the background noise by performing echo cancellation on the recorded sound including the content sound.

Figure 18:
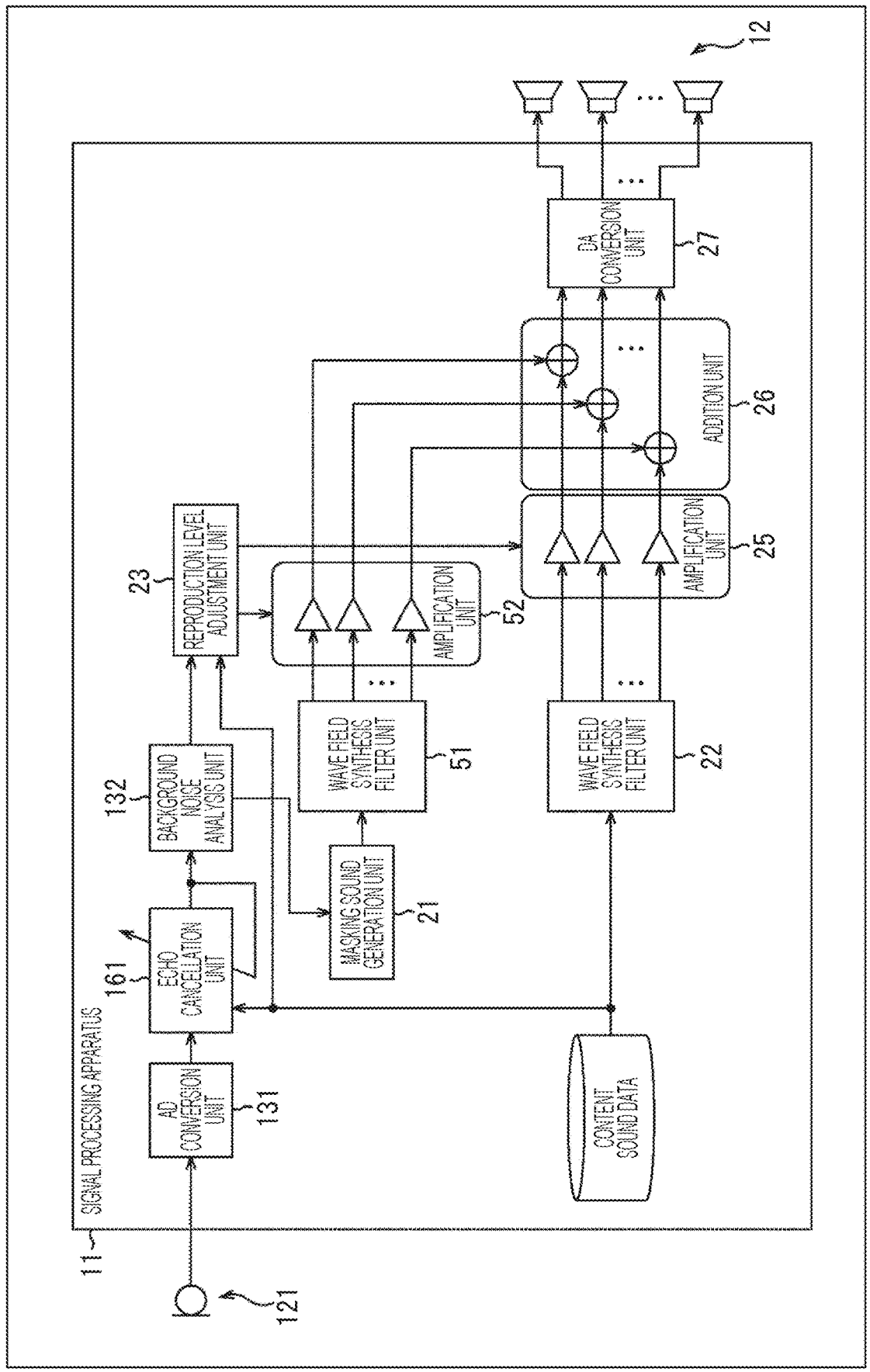
FIG. 18 is a diagram showing a configuration example of a content reproduction system.

In such a case, the content reproduction system is configured as shown in FIG. 18, for example. Note that portions in FIG. 18 corresponding to those of FIG. 14 are designated by the same reference numerals, and description is omitted as appropriate.

The content reproduction system shown in FIG. 18 includes a microphone 121, a signal processing apparatus 11, and a speaker array 12.

Furthermore, the configuration of the signal processing apparatus 11 shown in FIG. 18 has a configuration in which an echo cancellation unit 161 is newly provided in addition to the configuration of the signal processing apparatus 11 shown in FIG. 14, and has the same configuration as the signal processing apparatus 11 of FIG. 14 in other respects.

In the signal processing apparatus 11 shown in FIG. 18, the echo cancellation unit 161 is provided between the AD conversion unit 131 and the background noise analysis unit 132.

The echo cancellation unit 161 performs echo cancellation on the recorded sound supplied from the AD conversion unit 131 on the basis of the supplied content sound data, and supplies the recorded sound after the echo cancellation to the background noise analysis unit 132.

In the echo cancellation unit 161, the echo cancellation that cancels the content sound from the recorded sound is realized by performing the filtering processing on the recorded sound by using an echo cancellation filter.

At this time, the echo cancellation unit 161 updates the echo cancellation filter therein to receive the recorded sound and the content sound collected by the microphone 121 as inputs, cancel (erase) the content sound from the recorded sound, and output only the background noise.

An update algorithm of the echo cancellation filter can be, for example, a general least mean square (LMS) or normalized LMS (NLMS).

The background noise analysis unit 132 analyzes the level and the like of the recorded sound supplied from the echo cancellation unit 161 and supplies the analysis result to the masking sound generation unit 21 and the reproduction level adjustment unit 23.

The masking sound generation unit 21 generates a masking sound on the basis of the analysis result supplied from the background noise analysis unit 132 and supplies it to the wave field synthesis filter unit 51. For example, the masking sound generation unit 21 generates a masking sound by using the parameter table shown in FIG. 15 or by using a predictor obtained by learning in advance.

The reproduction level adjustment unit 23 controls the adjustment of the reproduction levels of the masking sound and the content sound on the basis of at least one of the analysis result supplied from the background noise analysis unit 132 and the supplied content sound data.

For example, the reproduction level adjustment unit 23 determines the reproduction level of the content sound and the reproduction level of the masking sound on the basis of the background noise level as the analysis result supplied from the background noise analysis unit 132 and the parameter table shown in FIG. 15 held in advance.

Description of the Content Reproduction Processing

Figure 19:
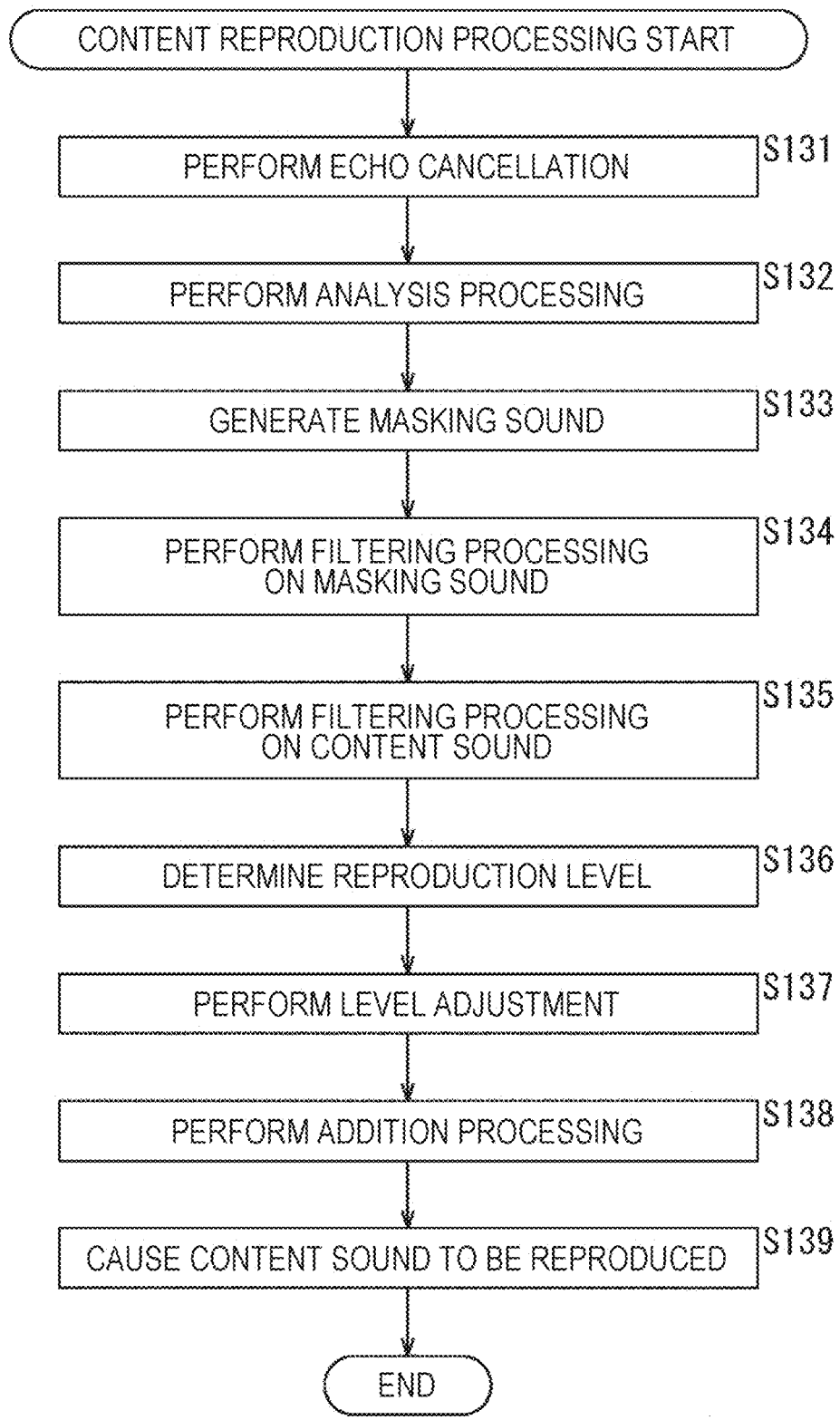
FIG. 19 is a flowchart explaining content reproduction processing.

In the content reproduction system shown in FIG. 18 as described above, the content reproduction processing shown in FIG. 19 is performed. That is, the content reproduction processing by the content reproduction system shown in FIG. 18 will be described below with reference to the flowchart of FIG. 19.

In step S131, the echo cancellation unit 161 performs echo cancellation on the recorded sound supplied from the AD conversion unit 131 on the basis of the supplied content sound data, and supplies the resulting recorded sound after the echo cancellation to the background noise analysis unit 132.

In step S131, echo cancellation is performed on the recorded sound collected by the microphone 121 at an arbitrary timing. Therefore, the content sound is canceled from the recorded sound, and the background noise is acquired (extracted).

When the background noise is obtained in this way, the processing of steps S132 to S139 is performed thereafter and the content reproduction processing ends. This processing is similar to the processing of steps S101 to S108 of FIG. 16, the description thereof will be omitted.

As described above, the content reproduction system acquires the background noise by performing echo cancellation, generates a masking sound on the basis of the background noise analysis result, and adjusts the reproduction levels of the content sound and the masking sound. Furthermore, the content reproduction system reproduces the content sound and the masking sound of which levels have been adjusted appropriately by wave field synthesis. In this way, it is possible to easily make a leaking sound difficult to hear.

Other Variation Examples

Configuration Example of the Content Reproduction System

Moreover, in the first to fifth embodiments described above, an example in which the content sound and the masking sound are reproduced by one speaker array 12 has been described. However, the masking sound and the content sound may be reproduced by different speakers or speaker arrays, and a speaker or speaker array that reproduces only the masking sound may be provided.

Figure 20:
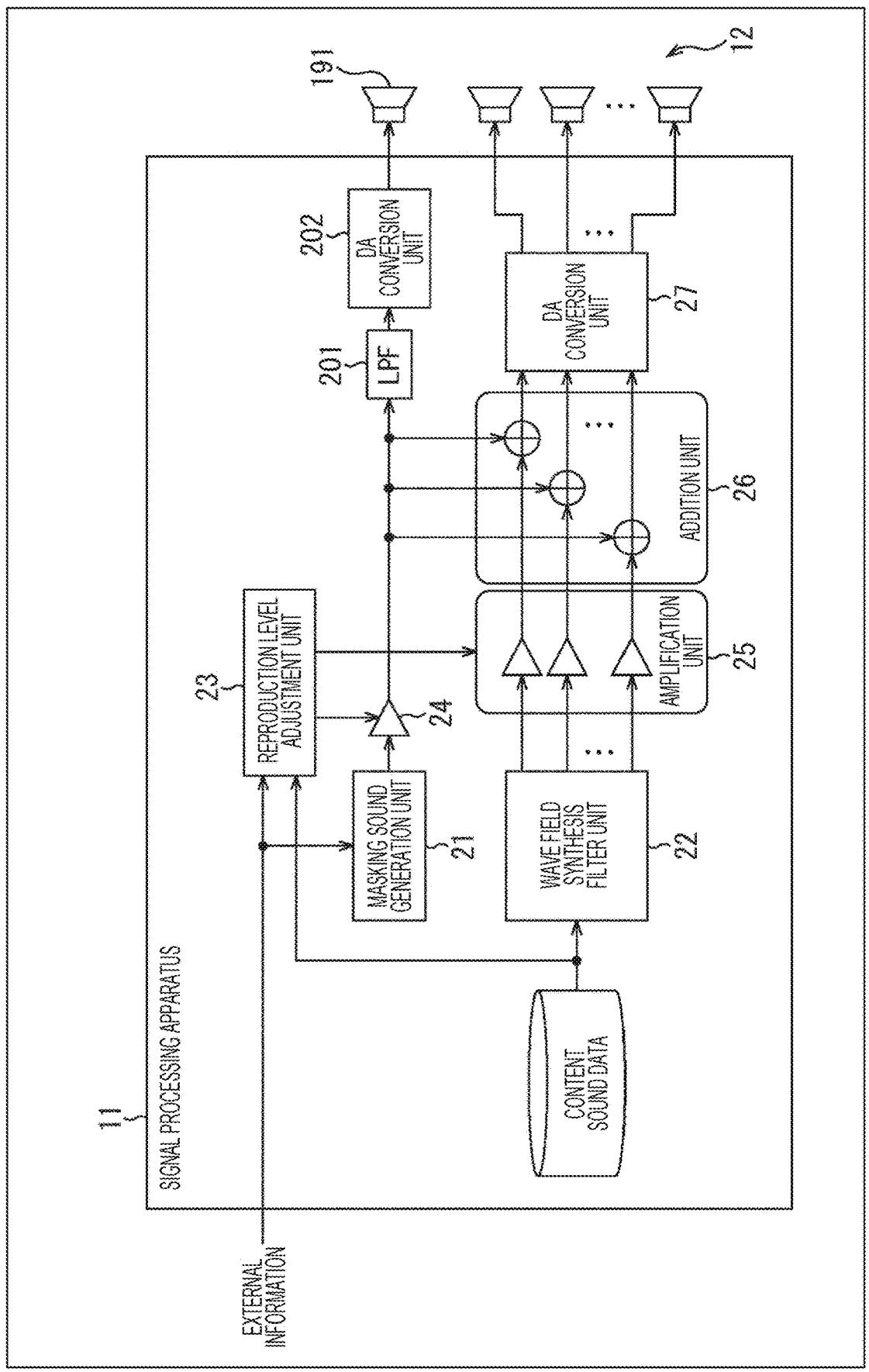
FIG. 20 is a diagram showing a configuration example of a content reproduction system.

For example, in the example shown in FIG. 3, in a case where a speaker for reproducing only the masking sound is newly provided in addition to the speaker array 12, the content reproduction system is configured as shown in FIG. 20. Note that portions in FIG. 20 corresponding to those of FIG. 3 are designated by the same reference numerals, and description is omitted as appropriate.

The content reproduction system shown in FIG. 20 includes a signal processing apparatus 11, a speaker array 12, and a speaker 191.

This content reproduction system has a configuration in which the speaker 191 is newly provided in addition to the configuration of the content reproduction system shown in FIG. 3.

Furthermore, the configuration of the signal processing apparatus 11 shown in FIG. 20 has a configuration in which a low pass filter (LPF) 201 and a DA conversion unit 202 are newly provided in addition to the configuration of the signal processing apparatus 11 shown in FIG. 3, and has the same configuration as the signal processing apparatus 11 of FIG. 3 in other respects.

In the signal processing apparatus 11 shown in FIG. 20, the masking sound output from the amplification unit 24 is supplied not only to the addition unit 26 but also to the LPF 201.

The LPF 201 is an LPF (low pass filter), and extracts only a low frequency component of the masking sound by performing the filtering processing using the low pass filter on the masking sound supplied from the amplification unit 24 and supplies the masking sound to the DA conversion unit 202.

The DA conversion unit 202 performs DA conversion on the masking sound supplied from the LPF 201, more specifically, the low frequency component of the masking sound, and supplies the resulting masking sound, which is an analog signal, to the speaker 191, and causes the speaker to reproduce the masking sound. In this case, the DA conversion unit 202 functions as an output unit that causes the masking sound to be output from the speaker 191.

The speaker 191 includes, for example, a speaker for low frequency reproduction having a larger diameter than the speaker constituting the speaker array 12, and outputs (reproduces) the masking sound supplied from the DA conversion unit 202.

In particular, in this example, the diameter of the speaker constituting the speaker array 12 is smaller than the diameter of the speaker 191. Therefore, it is difficult for the speaker array 12 to reproduce the low frequency component of the masking sound at sufficient sound pressure. Therefore, in the content reproduction system, mid-high frequency components of the masking sound are reproduced by the speaker array 12, and a low frequency component of the masking sound is reproduced by the speaker 191.

Note that, of course, the speaker array 12 may not reproduce the masking sound, and only the speaker 191 may reproduce the masking sound. By reproducing at least the low frequency component of the masking sound in another speaker 191 different from the speaker array 12 for reproducing the content sound in this way, the masking sound can be reproduced with desired frequency characteristics.

As described above, according to the present technology described in the first embodiment to the other variation examples, it is possible to easily make the leaking sound difficult to hear by reproducing the masking sound of an appropriate reproduction level.

Moreover, in the present technology, since a leaking sound from another divided region becomes difficult to hear in each divided region, it is possible to improve the degree of audible separation of the content sound. Therefore, the content of the content, that is, the information provided by the content can be more easily acquired.

In general, human hearing reacts sensitively even to small sounds that are a voice or music. Therefore, in a case where the leaking sound is such a voice or music, the leaking sound is heard by the listener in the divided region or the person in the vicinity of the divided region without being aware of it, which makes the person feel uncomfortable. Therefore, according to the present technology, by masking such leaking sound, the hearing does not react to the content sound that has become the leaking sound, and the person does not feel uncomfortable.

Furthermore, with the existing technology, it was necessary to increase the number of speakers in order to reduce the leaking sound, but with the present technology, it is possible to make the leaking sound difficult to hear even with a small number of speakers, so that the number of speakers can be reduced and the cost can be reduced.

Moreover, according to the present technology, it is not necessary to install a microphone at a control point for canceling sounds as in the existing technology, and even in a case where a microphone is used as an external sensor, the number of microphones can be reduced. Therefore, not only can the layout of the operation location of the content reproduction system be given a degree of freedom, but also the cost of equipment such as a microphone can be reduced.

In addition, according to the present technology, even in a case where a gap occurs in the radiation characteristics of the acoustic beam of the speaker due to manufacturing variations of the speaker that reproduces the content sound, deterioration over time, sound reflection and sound absorption in the reproduction environment, the effect caused by such gap can be suppressed (covered) by reproducing the masking sound. Therefore, the time and cost for the maintenance of the content reproduction system can be reduced.

Configuration Example of Computer

Incidentally, the series of processing described above can be executed by hardware and it can also be executed by software. In a case where the series of processing is executed by software, a program constituting the software is installed in a computer. Here, the computer includes a computer mounted in dedicated hardware, for example, a general-purpose a personal computer that can execute various functions by installing the various programs, or the like.

FIG. 21 is a block diagram showing a configuration example of hardware of a computer in which the series of processing described above is executed by a program.

In the computer, a central processing unit (CPU) 501, a read only memory (ROM) 502, a random access memory (RAM) 503, are interconnected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker array, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured in the manner described above, the series of processing described above is performed, for example, such that the CPU 501 loads a program stored in the recording unit 508 into the RAM 503 via the input/output interface 505 and the bus 504 and executes the program.

The program to be executed by the computer (CPU 501) can be provided by being recorded on the removable recording medium 511, for example, as a package medium or the like. Furthermore, the program can be provided via a wired or wireless transmission medium such as a local area network, the Internet, or digital satellite broadcasting.

In the computer, the program can be installed on the recording unit 508 via the input/output interface 505 when the removable recording medium 511 is mounted on the drive 510. Furthermore, the program can be received by the communication unit 509 via a wired or wireless transmission medium and installed on the recording unit 508. In addition, the program can be pre-installed on the ROM 502 or the recording unit 508.

Note that the program executed by the computer may be a program that is processed in chronological order along the order described in the present description or may be a program that is processed in parallel or at a required timing, e.g., when call is carried out.

Furthermore, the embodiment of the present technology is not limited to the aforementioned embodiments, but various changes may be made within the scope not departing from the gist of the present technology.

For example, the present technology can adopt a configuration of cloud computing in which one function is shared and jointly processed by a plurality of apparatuses via a network.

Furthermore, each step described in the above-described flowcharts can be executed by a single apparatus or shared and executed by a plurality of apparatuses.

Moreover, in a case where a single step includes a plurality of pieces of processing, the plurality of pieces of processing included in the single step can be executed by a single device or can be divided and executed by a plurality of devices.

Moreover, the present technology may be configured as below.

(1)

A signal processing apparatus including:
  a masking sound generation unit that, in a case where a first content is reproduced in a first region and a second content is reproduced in a second region by wave field synthesis using a speaker array, generates a masking sound for masking a sound of the first content and a sound of the second content heard in a region between the first region and the second region.

(2)

The signal processing apparatus according to (1), further including:
  an output unit that causes the speaker array to output the masking sound.

(3)

The signal processing apparatus according to (1) or (2), further including:
  an output unit that causes a speaker different from the speaker array to output the masking sound.

(4)
The signal processing apparatus according to any one of (1) to (3),
in which a reproduction level of the masking sound is larger than a background noise level.

(5)
The signal processing apparatus according to any one of (1) to (4), further including:
a wave field synthesis filter unit that performs filtering processing on the masking sound generated by the masking sound generation unit to generate a sound of each of a plurality of channels for reproducing the masking sound in a masking region between the first region and the second region by wave field synthesis.

(6)
The signal processing apparatus according to any one of (1) to (5),
in which the masking sound generation unit generates the masking sound on the basis of external information.

(7)
The signal processing apparatus according to (6),
in which the external information includes information indicating at least one of a time zone, a day of week, a number of visitors, and climate.

(8)
The signal processing apparatus according to any one of (1) to (5), further including:
a detection unit that detects a person from an image including at least a region around the first region and the second region as a subject,
in which the masking sound generation unit generates the masking sound on the basis of a result of detection of the person by the detection unit.

(9)
The signal processing apparatus according to any one of (1) to (5), further including:
an analysis unit that analyzes characteristics of ambient background noise,
in which the masking sound generation unit generates the masking sound on the basis of an analysis result of the characteristics.

(10)
The signal processing apparatus according to (9),
in which the masking sound generation unit generates the masking sound having a frequency characteristic according to the analysis result of the characteristics.

(11)
The signal processing apparatus according to (9) or (10), further including:
a reproduction level adjustment unit that adjusts a reproduction level of the masking sound on the basis of the analysis result of the characteristics.

(12)
The signal processing apparatus according to any one of (9) to (11), further including:
an echo cancellation unit that extracts the background noise by performing echo cancellation based on the sound of the first content and the sound of the second content with respect to a collected ambient sound.

(13)
The signal processing apparatus according to any one of (1) to (12),
in which the masking sound generation unit changes frequency characteristics of the masking sound according to frequency characteristics of the first content and the second content.

(14)
The signal processing apparatus according to any one of (1) to (13), further including:
a reproduction level adjustment unit that changes a reproduction level of the masking sound according to reproduction levels of the first content and the second content.

(15)
A signal processing method in which a signal processing apparatus,
in a case where a first content is reproduced in a first region and a second content is reproduced in a second region by wave field synthesis using a speaker array, generates a masking sound for masking a sound of the first content and a sound of the second content heard in a region between the first region and the second region.

(16)
A program that causes a computer to execute processing including a step of:
in a case where a first content is reproduced in a first region and a second content is reproduced in a second region by wave field synthesis using a speaker array, generating a masking sound for masking a sound of the first content and a sound of the second content heard in a region between the first region and the second region.

REFERENCE SIGNS LIST

11 Signal processing apparatus
12 Speaker array
21 Masking sound generation unit
22 Wave field synthesis filter unit
23 Reproduction level adjustment unit
24 Amplification unit
25 Amplification unit
51 Wave field synthesis filter unit
91 Recognition unit
121 Microphone
132 Background noise analysis unit
161 Echo cancellation unit

The invention claimed is:

1. A signal processing apparatus comprising:
circuitry configured to function as:
a masking sound generation unit that, in a case where a first content is reproduced in a first region and a second content is reproduced in a second region by wave field synthesis using a speaker array, generates a masking sound for masking a sound of the first content and a sound of the second content heard in a region between the first region and the second region; and
a detection unit that detects a person from an image including at least a region around the first region and the second region as a subject,
wherein the masking sound generation unit generates the masking sound on a basis of a result of detection of the person by the detection unit.

2. The signal processing apparatus according to claim 1, wherein the circuitry is further configured to function as:
an output unit that causes the speaker array to output the masking sound.

3. The signal processing apparatus according to claim 1, wherein the circuitry is further configured to function as:
an output unit that causes a speaker different from the speaker array to output the masking sound.

4. The signal processing apparatus according to claim 1, wherein a reproduction level of the masking sound is larger than a background noise level.

5. The signal processing apparatus according to claim 1, wherein the circuitry is further configured to function as:
a wave field synthesis filter unit that performs filtering processing on the masking sound generated by the masking sound generation unit to generate a sound of each of a plurality of channels for reproducing the masking sound in a masking region between the first region and the second region by wave field synthesis.

6. The signal processing apparatus according to claim 1, wherein the masking sound generation unit generates the masking sound on a basis of external information.

7. The signal processing apparatus according to claim 6, wherein the external information includes information indicating at least one of a time zone, a day of week, a number of visitors, and climate.

8. The signal processing apparatus according to claim 1, wherein the circuitry is further configured to function as:
an analysis unit that analyzes characteristics of ambient background noise,
wherein the masking sound generation unit generates the masking sound on a basis of an analysis result of the characteristics.

9. The signal processing apparatus according to claim 8, wherein the masking sound generation unit generates the masking sound having a frequency characteristic according to the analysis result of the characteristics.

10. The signal processing apparatus according to claim 8, wherein the circuitry is further configured to function as:
a reproduction level adjustment unit that adjusts a reproduction level of the masking sound on a basis of the analysis result of the characteristics.

11. The signal processing apparatus according to claim 8, wherein the circuitry is further configured to function as:
an echo cancellation unit that extracts the background noise by performing echo cancellation based on the sound of the first content and the sound of the second content with respect to a collected ambient sound.

12. The signal processing apparatus according to claim 1, wherein the masking sound generation unit changes frequency characteristics of the masking sound according to frequency characteristics of the first content and the second content.

13. The signal processing apparatus according to claim 1, wherein the circuitry is further configured to function as:
a reproduction level adjustment unit that changes a reproduction level of the masking sound according to reproduction levels of the first content and the second content.

14. A signal processing method wherein a signal processing apparatus,
in a case where a first content is reproduced in a first region and a second content is reproduced in a second region by wave field synthesis using a speaker array, generates a masking sound for masking a sound of the first content and a sound of the second content heard in a region between the first region and the second region, and
detects a person from an image including at least a region around the first region and the second region as a subject,
wherein generating the masking sound is on a basis of a result of detection of the person.

15. A non-transitory storage medium encoded with instructions that, when executed by a computer, execute processing comprising:
in a case where a first content is reproduced in a first region and a second content is reproduced in a second region by wave field synthesis using a speaker array, generating a masking sound for masking a sound of the first content and a sound of the second content heard in a region between the first region and the second region; and
detecting a person from an image including at least a region around the first region and the second region as a subject,
wherein generating the masking sound is on a basis of a result of detection of the person.

* * * * *